United States Patent
Hayashibe et al.

(10) Patent No.: US 10,288,940 B2
(45) Date of Patent: May 14, 2019

(54) OPTICAL ELEMENT, PROJECTION TYPE IMAGE DISPLAY APPARATUS, AND ORIGINAL RECORDING

(71) Applicant: Sony Corporation, Tokyo (JP)

(72) Inventors: Kazuya Hayashibe, Kanagawa (JP); Shunichi Kajiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 868 days.

(21) Appl. No.: 14/197,250

(22) Filed: Mar. 5, 2014

(65) Prior Publication Data

US 2014/0267942 A1  Sep. 18, 2014

(30) Foreign Application Priority Data

Mar. 18, 2013 (JP) ................................. 2013-055130

(51) Int. Cl.
   *G02F 1/13363* (2006.01)
   *G02B 5/30* (2006.01)

(52) U.S. Cl.
   CPC ....... *G02F 1/13363* (2013.01); *G02B 5/3083* (2013.01); *G02F 2201/38* (2013.01)

(58) Field of Classification Search
   None
   See application file for complete search history.

(56) References Cited

U.S. PATENT DOCUMENTS

| | | | | |
|---|---|---|---|---|
| 5,659,562 A | * | 8/1997 | Hisa | H01S 5/12 372/50.11 |
| 6,128,059 A | * | 10/2000 | Nishiguchi | G02B 27/2214 348/E13.015 |
| 2002/0196547 A1 | * | 12/2002 | Kleemann | G02B 5/1828 359/575 |
| 2007/0047254 A1 | * | 3/2007 | Schardt | G02B 5/0242 362/607 |
| 2009/0147385 A1 | * | 6/2009 | Hsu | G02B 5/0231 359/831 |
| 2009/0148114 A1 | * | 6/2009 | Numata | G02B 6/1225 385/131 |
| 2010/0014073 A1 | * | 1/2010 | Hashiguchi | B82Y 20/00 356/128 |
| 2010/0039707 A1 | * | 2/2010 | Akahane | B82Y 30/00 359/576 |
| 2010/0322558 A1 | * | 12/2010 | Ogawa | G02B 6/12007 385/37 |
| 2011/0255390 A1 | * | 10/2011 | Hirai | G02B 5/1809 369/100 |
| 2012/0194911 A1 | * | 8/2012 | Li | G02B 5/1809 359/566 |

(Continued)

FOREIGN PATENT DOCUMENTS

| | | | |
|---|---|---|---|
| JP | 2007-011280 A | 1/2007 | |
| JP | 2008-070666 A | 3/2008 | |
| JP | 2008070666 A | * 3/2008 | ............... G02B 5/30 |

*Primary Examiner* — Edward J Glick
*Assistant Examiner* — Anthony G Quash
(74) *Attorney, Agent, or Firm* — Chip Law Group

(57) ABSTRACT

An optical element includes, on a surface thereof, a plurality of structural bodies which extend in a first direction, where the plurality of structural bodies are aligned at a pitch of a sub-wavelength in a second direction which intersects with the first direction, and the widths of the structural bodies are changed periodically.

7 Claims, 11 Drawing Sheets

(56) References Cited

U.S. PATENT DOCUMENTS

2014/0184994 A1* 7/2014 Kuroda .................... B32B 7/02
                                                                              349/96
2016/0067931 A1* 3/2016 Yang ..................... B29C 59/026
                                                                              428/156

* cited by examiner

115A 101R, 101G, 101B

OPTICAL ELEMENT, PROJECTION TYPE IMAGE DISPLAY APPARATUS, AND ORIGINAL RECORDING

CROSS REFERENCE TO RELATED APPLICATIONS

This application claims the benefit of Japanese Priority Patent Application JP 2013-055130 filed Mar. 18, 2013, the entire contents of which are incorporated herein by reference.

BACKGROUND

The present technology relates to an optical element, a projection type image display apparatus which is provided with the same, and an original recording for manufacturing the same. In more detail, the present technology relates to an optical element which is used in phase difference compensation for liquid crystal panels or the like, a projection type image display apparatus which is provided with the same, and an original recording for manufacturing the same.

Projector apparatuses (projection type image display apparatuses) which realize a large screen by enlarging and projecting an image onto a screen are utilized in a wide range of fields. In recent years, so-called liquid crystal projector apparatuses which perform projection onto a screen by optically modulating light which is emitted from a light source with a liquid crystal display apparatus are particularly common. The liquid crystal display apparatus displays images in a display mode which corresponds to the type of liquid crystal molecules which are used in the liquid crystal panel.

For example, Vertically Aligned (VA) mode liquid crystal display apparatuses where liquid crystal molecules which have a negative dielectric anisotropy are sealed with perpendicular light distribution between a pair of substrates which configure a liquid crystal panel are widely used. In the VA mode liquid crystal display apparatuses, since the liquid crystal molecules are aligned to be substantially perpendicular with respect to the main surface of the substrates when no electric field is applied, light passes through the liquid crystal layer and hardly changes the polarization plane thereof. Accordingly, by installing polarizing plates above and below the substrate, a favorable black display is possible when no electric field is applied. The VA mode liquid crystal display apparatus has the advantage that it is possible to realize a high contrast in comparison with a Twisted Nematic (TN) mode liquid crystal display apparatus.

In the VA mode liquid crystal display apparatus, birefringence is obtained by inclining and aligning the liquid crystal molecules when an electric field is applied. Therefore, when no electric field is applied, the liquid crystal molecules are aligned to have a minute inclination angle (pre-tilt angle) in advance. In this manner, since the liquid crystal molecules are not completely perpendicular with respect to the main surface of the substrates when no electric field is applied and the alignment is slightly inclined, residual phase difference is generated in the liquid crystal panel. Accordingly, the polarization plane of the incident light from the perpendicular direction is slightly rotated and, as a result, the contrast is decreased by the generation of light leakage from the polarization plate.

Here, a technique is proposed which uses a phase difference compensation plate where the amount of phase difference in the in-plane direction is small to compensate for the residual phase difference in the liquid crystal panel and obtain a high contrast. The amount of phase difference of the phase difference compensation plate is different according to the liquid crystal panel to be used; however, a small phase difference amount of 30 nm or less is desirable. As phase difference compensation plates which have small phase difference amounts, phase difference compensation plates not in the related art have been proposed.

Japanese Unexamined Patent Application Publication No. 2008-70666: A phase difference compensation plate formed of a body obtained by combining an optical multilayer film where a plurality of layers with different refractive indices are laminated in a regular order and a polymer film is proposed.

Japanese Unexamined Patent Application Publication No. 2007-11280: Imparting an anti-reflection function to a phase difference compensation plate by providing an anti-reflection film on the surface of the phase difference compensation plate is proposed.

SUMMARY

Accordingly, it is desirable to provide an optical element which has both phase difference compensation and anti-reflection functions, a projection type image display apparatus which is provided with the same, and an original recording for manufacturing the same.

An optical element according to a first embodiment of the present technology includes a plurality of structural bodies which extend in a first direction on a surface, in which the plurality of structural bodies are aligned at a pitch of a sub-wavelength in a second direction which intersects with the first direction, and the widths of the structural bodies are changed periodically.

A projection type image display apparatus according to a second embodiment of the present technology includes a light source, a liquid crystal panel, and an optical element, in which the optical element is provided with a plurality of structural bodies which extend in a first direction on a surface, in which the plurality of structural bodies are aligned at a pitch of a sub-wavelength in a second direction which intersects with the first direction, and the widths of the structural bodies are changed periodically.

An original recording according to a third embodiment of the present technology includes a plurality of grooves which extend in the first direction, in which the plurality of grooves are aligned at a pitch of a sub-wavelength in a second direction which intersects with the first direction, and the widths of the grooves are changed periodically.

According to the first and the second embodiments of the present technology, since the plurality of structural bodies which extend in the first direction are aligned at a pitch of a sub-wavelength in a second direction which intersects with the first direction, it is possible to impart a phase difference compensation function to the optical element. In addition, since the widths of the plurality of structural bodies which extend in the first direction are changed periodically, it is possible to impart an anti-reflection function to the optical element.

According to the third embodiment of the present technology, the plurality of grooves which extend in the first direction are aligned at a pitch of a sub-wavelength on the surface of an original recording in the second direction which intersects with the first direction. Accordingly, the grooves extend in the first direction and it is possible to form the grooves by transferring the structural bodies which are aligned at a pitch of a sub-wavelength in the second direction which intersects with the first direction.

As described above, according to the present technology, it is possible to provide an optical element which has both phase difference compensation and anti-reflection functions.

DETAILED DESCRIPTION OF EMBODIMENTS

Embodiments of the present technology will be described in the following order with reference to the drawings.
1. First Embodiment (Example of an Optical Element)
2. Second Embodiment (Example of a Projection Type Image Display Apparatus)

1. Embodiment 1

Configuration of Optical Element

Figure 1:
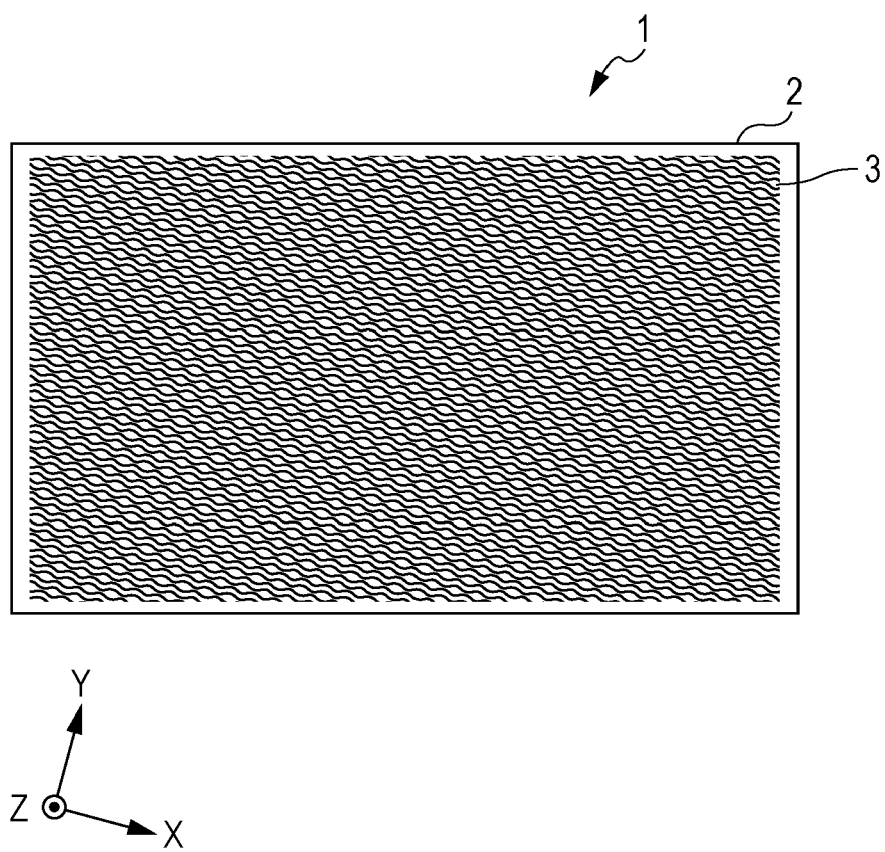
FIG. 1 is a planar diagram which shows an example of the external appearance of an optical element according to a first embodiment of the present technology.

FIG. 1 is a planar diagram which shows an example of the external appearance of an optical element according to a first embodiment of the present technology. An optical element 1 is an optical element which has both phase difference compensation and anti-reflection functions. The optical element 1 is provided with a substrate 2 which has a surface with a rectangular shape, and a plurality of structural bodies 3 which are provided on the surface. Here, the surface of the substrate 2 is not limited to a rectangular shape, and may adopt a shape other than a rectangular shape according to necessity. In the present specification, the first direction and the second direction which intersects with the first direction in the in-plane of the surface of the optical element 1 are respectively referred to as the X axis direction (the first direction) and the Y axis direction (the second direction), and the direction which is perpendicular with the surface thereof (the XY plane) is referred to as the Z axis direction (the third direction).

The optical element 1 has birefringence. More specifically, in the optical element 1, the refractive index $n_x$ in the X axis direction and the refractive index $n_y$ in the Y axis direction are different. The refractive indexes $n_x$ and $n_y$ satisfy a relationship where $n_x > n_y$. Accordingly, the direction of the slow axis of the optical element 1 coincides with the X axis direction and the direction of the fast axis coincides with the Y axis direction.

The in-plane retardation Re of the optical element 1 is preferably in a range of 3 degrees or more to 8 degrees or less, more preferably 5 degrees or more to 8 degrees or less. When the in-plane retardation Re is 3 degrees or more, it is possible to suitably use the optical element 1 as a phase difference compensation element for a projector apparatus or the like. On the other hand, when the in-plane retardation Re is 8 degrees or less, it is possible to manufacture a phase difference compensation element with a favorable shape.

Substrate

The substrate 2, for example, has transparency and optical isotropy. As the material of the substrate 2, for example, it is possible to use organic material such as a resin material or inorganic material such as glass and the use of inorganic material such as glass is preferable from the point of view of light resistance and favorable optical isotropy. Examples of the glass include soda glass, alkali-free glass, quartz glass, or the like. Examples of the resin material include plastic materials such as polymethyl methacrylate, polystyrene, polycarbonate, polyether sulfone, polyallylate, amorphous polyolefin, cyclo-olefin polymers (trade names: Arton and Zeonor), cyclo-olefin copolymers, triacetyl cellulose, or epoxy resins.

In a case where a resin material is used as the substrate 2, an undercoat layer may be set to be provided as a surface treatment in order to further enhance the surface energy, the coating property, the slipping property, the planarity, and the like of the substrate surface. Examples of the material of the undercoat layer include organo alkoxy metal compounds, polyester, acrylic-modified polyester, polyurethanes, and the like. In addition, in order to obtain the same effect as providing the undercoat layer, a surface treatment such as corona discharging, or UV irradiation treatment may be set to be performed with respect to the surface of the substrate 2.

Examples of the shape of the substrate 2 include a film shape, a plate shape, and a block shape; however, the present disclosure is not particularly limited to these shapes. Here, the film shape is defined to include a sheet shape. The thickness of the substrate 2 is, for example, approximately 25 μm to 500 μm. In a case where the substrate 2 is a plastic film, examples of the forming method of the substrate 2 include a method of extending the resin material after discharging the resin material into a film shape, a method of drying the resin material by depositing the resin material in a film shape after dilution in a solvent, and the like. The substrate 2 may be a constituent component of a member, device, or the like where the optical element 1 is applied.

Structural Body

Figure 2A:
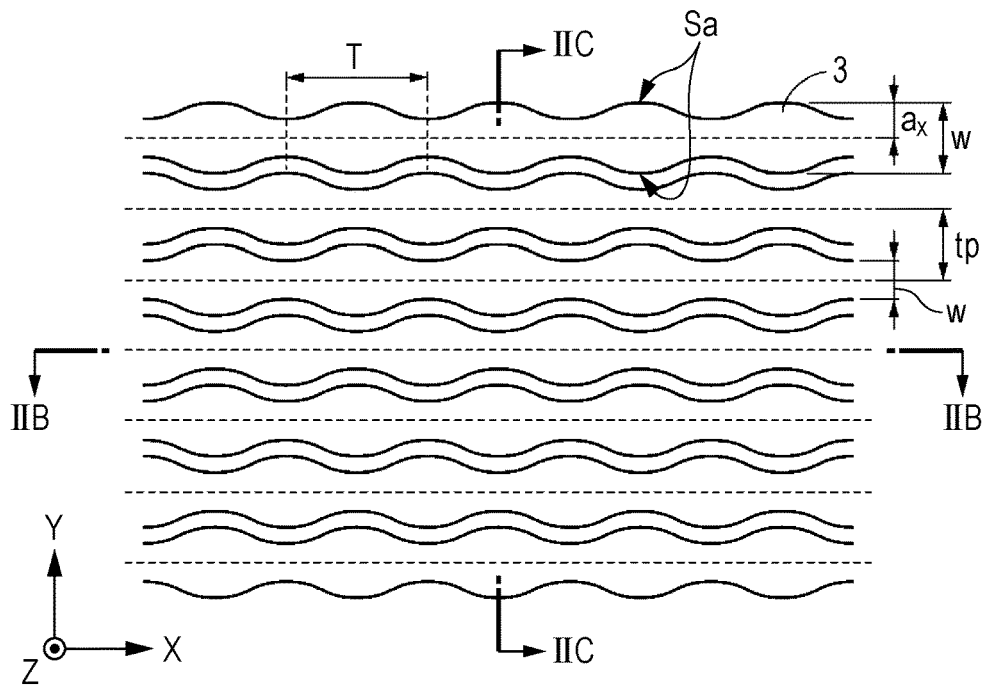
FIG. 2A is a planar diagram which represents an enlarged part of a surface of the optical element which is shown in FIG. 1.
Figure 2B:
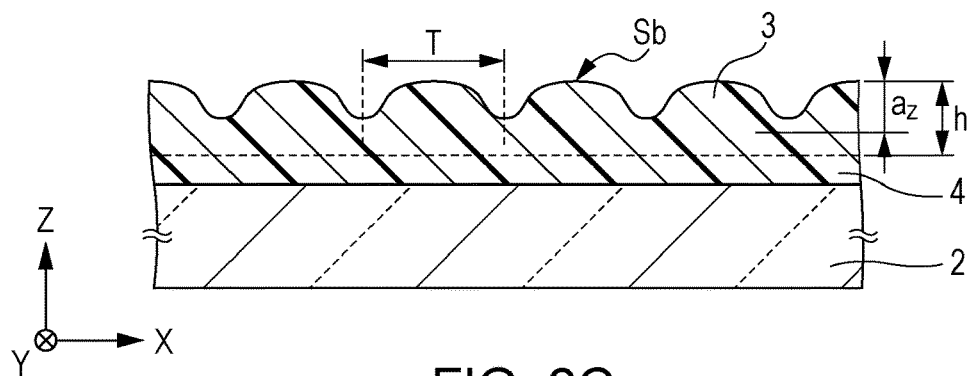
FIG. 2B is a cross-sectional diagram along the line IIB-IIB in FIG. 2A.
Figure 2C:
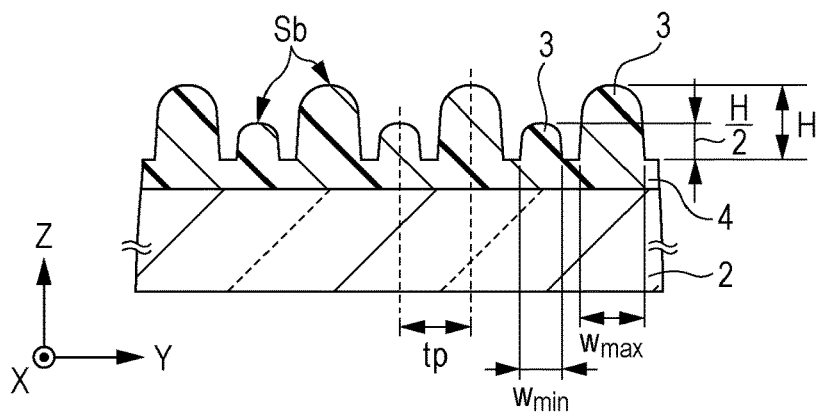
FIG. 2C is a cross-sectional diagram along the line IIC-IIC in FIG. 2A.

FIG. 2A is a planar diagram which represents an enlarged part of a surface of the optical element which is shown in FIG. 1. FIG. 2B is a cross-sectional diagram along the line IIB-IIB in FIG. 2A. FIG. 2C is a cross-sectional diagram along the line IIC-IIC in FIG. 2A. Here, FIG. 2B and FIG. 2C show an example where a plurality of structural bodies 3 are provided on one surface of the optical element 1; however, a plurality of structural bodies 3 may be set to be provided on both surfaces of the optical element 1.

The plurality of structural bodies 3 have a convex shape with respect to the surface of the substrate 2. When the plurality of structural bodies 3 are viewed from the side of a direction (the Z axis direction) which is orthogonal with respect to the surface of the optical element 1, the plurality of structural bodies 3 have a striped shape. More specifically, the plurality of structural bodies 3 have an elongated shape which extends in the X axis direction (the first direction). The extension direction is the direction of the slow axis of the optical element 1. Then, the extended structural bodies 3 are arranged periodically at a pitch tp of a sub-wavelength in the Y axis direction (the second direction) which intersects with the X axis direction (the first direction) which is the extension direction. This arrangement direction is the direction of the fast axis of the optical element 1. According to the configuration of the plurality of structural bodies 3, it is possible to impart a phase compensation function to the optical element 1.

Here, the sub-wavelength refers to a wavelength which is approximately the same as or less than the light with the object of reducing the reflection. The wavelength band of the light with the object of reducing the reflection is, for example, the wavelength band of ultraviolet light, the wavelength band of visible light, or the wavelength band of infrared light. Here, the wavelength band of ultraviolet light refers to a wavelength band of 10 nm to 360 nm, the wavelength band of visible light refers to a wavelength band of 360 nm to 830 nm, and the wavelength band of infrared light refers to a wavelength band of 830 nm to 1 mm.

The width w of the structural bodies 3 with respect to the arrangement direction (the Y axis direction) of the structural bodies 3 is changed by periodically repeating increasing and decreasing. Due to this, it is possible to impart an anti-reflection function to the optical element 1. Here, the width w of the structural bodies 3 refers to half the width (full width at half maximum: FWHM) of the height of the structural bodies 3. At a position where the width w of the structural bodies 3 of one out of two adjacent structural bodies 3 is the widest, the width w of the other structural body 3 is preferably the narrowest. Due to this, since there is a configuration where a convex section of the side surface Sa of the other structural body 3 is inserted into a concave section of the side surface Sa of the one structural body 3 out of the two adjacent structural bodies 3, it is possible to suppress the widening of the space between the two adjacent structural bodies 3 while continuing to change the width w of the structural bodies 3. Accordingly, the filling ratio of the structural bodies 3 increases and the anti-reflection characteristic is improved.

More specifically, both side surfaces Sa of the structural bodies 3 are wave surfaces which vibrate periodically in the width direction (the Y axis direction) of the structural bodies 3. At a position where the amplitude $a_x$ of one adjacent wave surface is the maximum, the amplitude $a_x$ of the other is the minimum. That is, the phases of the periods T of the adjacent wave surfaces are shifted by 180°. Here, the amplitude $a_x$ of the wave surface is the amplitude with respect to the arrangement direction (the Y axis direction) of the structural bodies 3. Both side surfaces Sa of the structural bodies 3 are, for example, orthogonal or inclined with respect to the surface (the XY plane) of the optical element 1 and from the point of view of improving the anti-reflection characteristic, inclined is preferable.

The average ratio $R_{w/tp}$ of the maximum width $w_{max}$ of the structural bodies 3 with respect to the pitch tp of the structural bodies 3 is preferably 0.4 or more to 0.8 or less, more preferably more than 0.5 to 0.8 or less, and even more preferably in a range of more than 0.5 to 0.7 or less. When the average ratio $R_{w/tp}$ is 0.4 or more, it is possible to obtain an excellent anti-reflection characteristic. When the average ratio $R_{w/tp}$ is 0.8 or less, it is possible to impart suitable retardation to the optical element 1 as a phase compensation element for a projector apparatus or the like. Here, in a case where the average ratio $R_{w/tp}$ is more than 0.5, at a position where the width w of the structural bodies 3 of one out of two adjacent structural bodies 3 is the widest, the width w of the other structural body 3 is preferably the narrowest. This is because, by adopting such a configuration, it is possible to improve the filling ratio of the structural bodies 3 without two adjacent structural bodies 3 overlapping even in a case where the average ratio $R_{w/tp}$ is more than 0.5. Here, the maximum width $w_{max}$ of the structural bodies 3 has the meaning of the maximum value of the width w of the structural bodies 3.

The average ratio $R_{w/tp}$ of the maximum width $w_{max}$ of the structural bodies 3 with respect to the pitch tp of the structural bodies 3 is determined in the following manner. Firstly, the surface of the optical element 1 is imaged from a top view and cross section view using a scanning electron microscope (SEM). Next, a structural body is picked out at random from the imaged SEM photograph and the maximum width $w_{max}$ and pitch tp of the structural body are measured (refer to FIG. 2A and FIG. 2C). Next, the imaging and measuring procedure is repeated and the maximum width $w_{max}$ and the pitch tp are obtained for a total of ten structural bodies. Next, after determining the ratios ($w_{max}$/tp) for each of the total of ten structural bodies, the average ratio $R_{w/tp}$ is determined by simply averaging (arithmetically averaging) these ratios ($w_{max}$/tp).

The height h of the structural bodies 3 is either constant or changing with respect to the extension direction (the X axis direction) of the structural bodies 3, and from the point of view of improving the anti-reflection characteristic, changing is preferable. Here, FIG. 2B shows an example where the height h of the structural bodies 3 changes with respect to the extension direction (the X axis direction) of the structural bodies 3. The changing periods of the width w and the height h of the structural bodies 3 are preferably synchronized from the point of view of improving the anti-reflection characteristic. In such a case, the width w of the structural bodies 3 is the maximum at a position where the height h of the structural bodies 3 is the maximum and the width w of the structural bodies 3 is the minimum at a position where the height h of the structural bodies 3 is the minimum.

The upper surface Sb of the structural bodies 3 is a flat surface or a wave surface, and from the point of view of improving the anti-reflection characteristic, the wave surface is preferable. Here, FIG. 2B shows an example where the upper surface Sb of the structural bodies 3 is a wave surface. In a case where the upper surface Sb of the structural bodies 3 is a wave surface, the wave surface is a wave surface which vibrates periodically at the amplitude $a_z$ in the height direction (the Z axis direction) of the structural bodies 3. The vibration periods of the wave surface of the upper surface Sb and the wave surface of both side surfaces Sa are preferably synchronized from the point of view of improving the anti-reflection characteristic. In such a case, the amplitude $a_x$ of the wave surface of both side surfaces Sa is the maximum at a position where the amplitude $a_z$ of the wave surface of the upper surface Sb is the maximum and the amplitude $a_x$ of the wave surface of both side surfaces Sa is the minimum at a position where the amplitude $a_z$ of the wave surface of the upper surface Sb is the minimum.

The structural bodies 3, for example, have a shape which is symmetrical with respect to the XZ plane which includes the extension direction (the X axis direction) and the height direction (the Z axis direction) of the structural bodies 3. Accordingly, in the YZ plane which includes the arrangement direction (the Y axis direction) and the height direction (the Z axis direction) of the structural bodies 3, the shape of a cross section (a YZ cross section) which is cut away in the structural bodies 3 has, for example, a shape which is line-symmetrical with respect to the Z axis as shown in FIG. 2C. Examples of the cross-sectional shape include a curved shape where the inclination of the top section is gradual and the inclination from the central portion to the bottom section becomes steep gradually, a curved shape where the inclination of the central portion is steeper than the bottom section and the top section, a substantially polygonal shape, an irregular shape, or the like; however, the present disclosure is not limited to these shapes. Examples of the curved shapes include a substantially U-shape, a substantially parabolic shape, a substantially partially circular shape, a substantially partially elliptical shape, or the like; however, the present disclosure is not limited to these shapes. Here, the substantially parabolic shape, the substantially partially circular shape, the substantially partially elliptical shape, and the substantially polygonal shape include shapes which are strictly defined mathematically, and shapes where some deformation, distortion, or the like is imparted to the shapes above. The partially circular shape is a shape of a part of a circle, for example, a semi-circular shape. The partially elliptical shape is a shape of a part of an ellipse, for example, a semi-elliptical shape. Examples of the polygonal shapes include triangular shapes (V shapes), rectangular shapes (for example, trapezoidal shapes or the like), pentagonal shapes, and the like, and a curvature R or the like may be applied to the top section of these shapes.

The structural bodies 3, for example, have transparency. The structural bodies 3, for example, include at least one type which is selected from a group consisting of an energy ray-curable resin composition, a thermosetting resin composition, and a thermoplastic resin composition. According to necessity, the structural bodies 3 may further include additives such as a polymerization initiator, a light stabilizer, an ultraviolet absorber, a catalyst, an antistatic agent, a lubricant, a leveling agent, an anti-foaming agent, a polymerization accelerator, an antioxidant, a flame retardant, an infrared absorbing agent, a surfactant, a surface modifier, a thixotropic agent, a plasticizer, or the like.

Intermediate Layer

The optical element 1 may be further provided with an intermediate layer 4 between the substrate 2 and the structural bodies 3 according to necessity. The intermediate layer 4 is a layer which is integrally formed with the structural bodies 3 at the bottom section side of the structural bodies 3 and is configured by the same material as the structural bodies 3.

Configuration of Roll Original Recording

Figure 3:
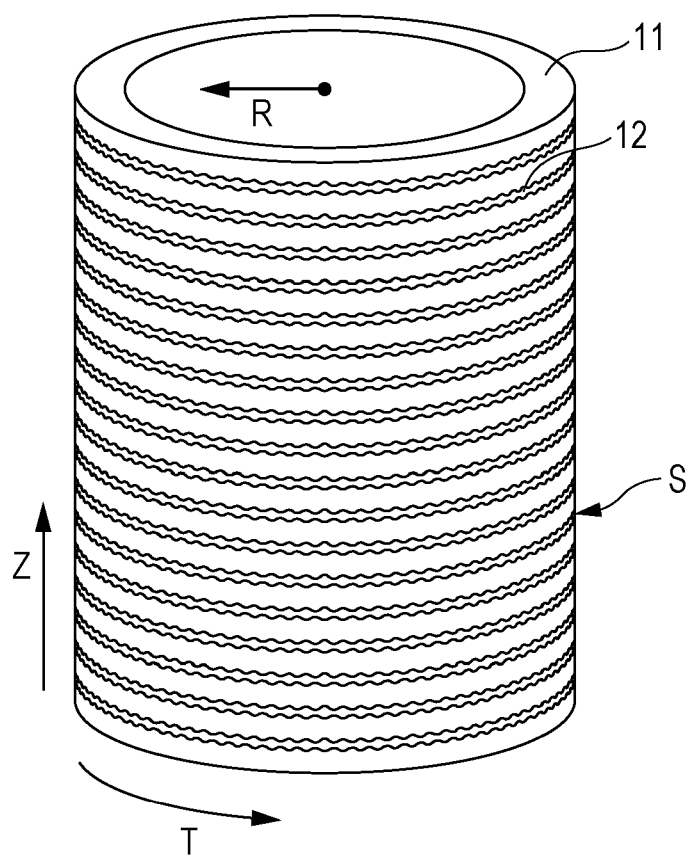
FIG. 3 is a perspective diagram which shows an example of the external appearance of a roll original recording according to the first embodiment of the present technology.

FIG. 3 is a perspective diagram which shows an example of the external appearance of a roll original recording according to the first embodiment of the present technology.

Figure 4A:
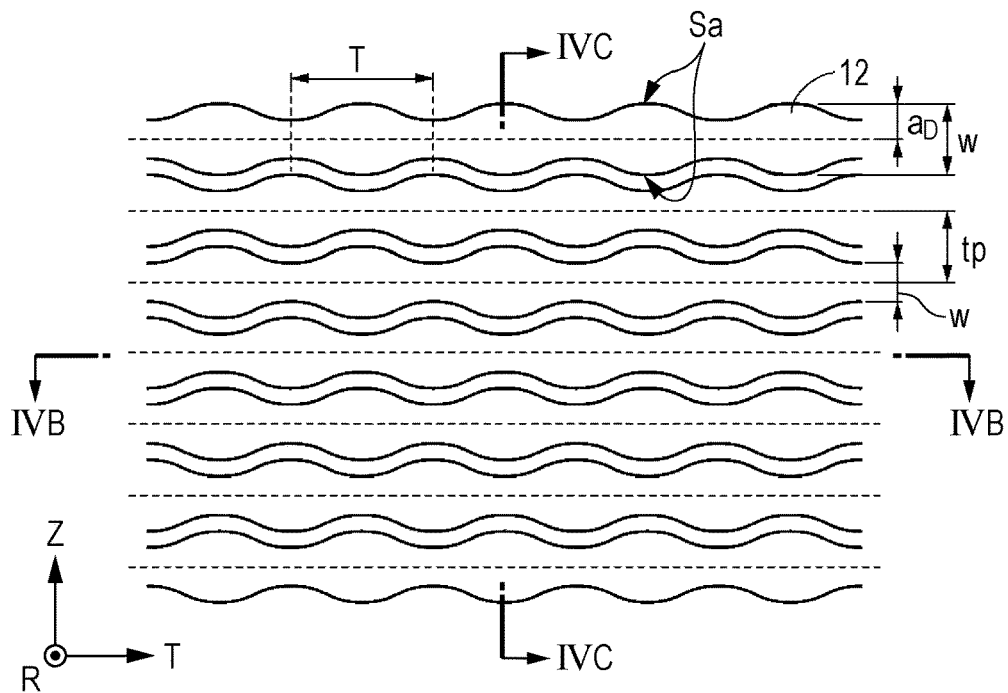
FIG. 4A is a planar diagram which represents an enlarged part of a surface of the roll original recording which is shown in FIG. 3.
Figure 4B:
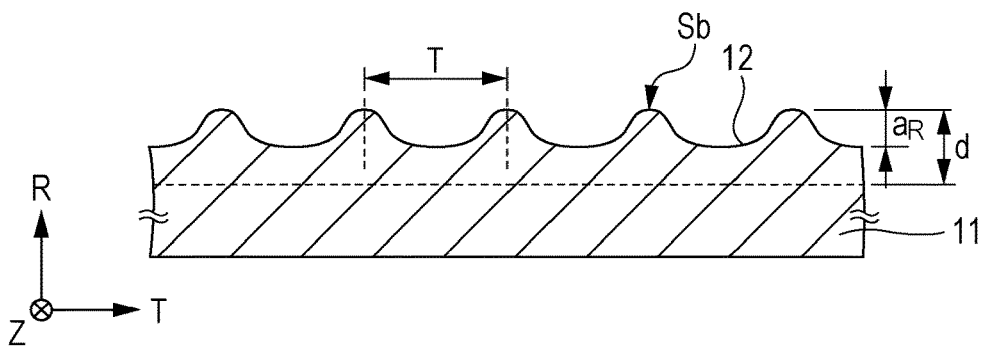
FIG. 4B is a cross-sectional diagram along the line IVB-IVB in FIG. 4A.
Figure 4C:
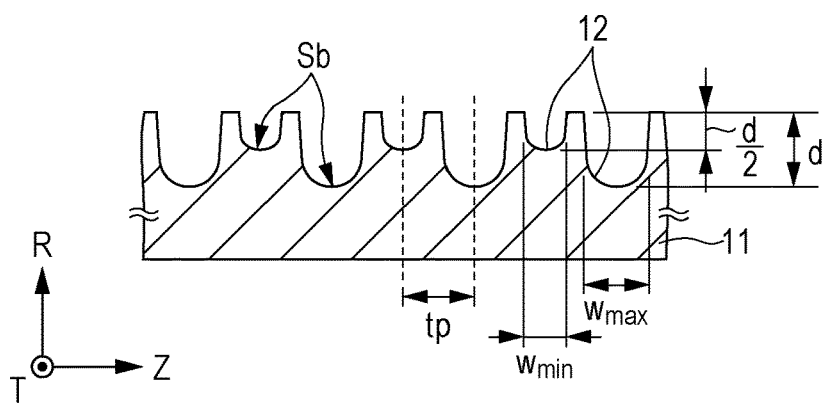
FIG. 4C is a cross-sectional diagram along the line IVC-IVC in FIG. 4A.

FIG. 4A is a planar diagram which represents an enlarged part of a surface of the roll original recording which is shown in FIG. 3. FIG. 4B is a cross-sectional diagram along the line IVB-IVB in FIG. 4A. FIG. 4C is a cross-sectional diagram along the line IVC-IVC in FIG. 4A.

A roll original recording 11 is an original recording for manufacturing the optical element 1 which has the configuration described above. The roll original recording 11 has, for example, a columnar shape or a cylindrical shape and the columnar surface or the cylindrical surface thereof is set as a forming surface S for forming the structural bodies 3 on the surface of the optical element 1. A plurality of grooves 12 which have a concave shape with respect to the forming surface S are provided on the forming surface S, for example.

The plurality of grooves 12 which are provided on the forming surface S of the roll original recording 11 and the plurality of structural bodies 3 which are provided on the surface of the substrate 2 described above have an inverted concave-convex relationship. It is possible to use, for example, glass, as the material of the roll original recording 11; however, the material is not particularly limited.

The plurality of grooves 12 have a striped shape when viewed from the side of the direction (the radial direction R of the roll original recording 11) which is orthogonal with respect to the forming surface S of the roll original recording 11. More specifically, the plurality of grooves 12 have an elongated shape which extends in a circumference direction T (the first direction) of the forming surface S. Then, the extended grooves 12 are arranged periodically at a pitch tp of a sub-wavelength in the axis direction Z (the second direction) of the roll original recording 11 which intersects with the circumference direction T (the first direction) which is the extension direction.

The width w of the grooves 12 with respect to the arrangement direction (the axis direction Z) of the grooves 12 is changed by periodically repeating increasing and decreasing. Here, the width w of the grooves 12 refers to half the width (full width at half maximum: FWHM) of the depth of the grooves 12. At a position where the width w of the groove 12 of one out of two adjacent grooves 12 is the widest, the width w of the other groove 12 is preferably the narrowest. Due to this, since there is a configuration where a convex section of the side surface Sa of the other groove 12 is inserted into a concave section of the side surface Sa of the one groove 12 out of the two adjacent grooves 12, it is possible to suppress the widening of the space between the two adjacent grooves 12 while continuing to change the width w of the grooves 12. Accordingly, the filling ratio of the grooves 12 increases.

More specifically, both side surfaces Sa of the grooves 12 are wave surfaces which vibrate periodically in the width direction (the axis direction Z) of the grooves 12. At a position where the amplitude $a_D$ of one adjacent wave front is the maximum, the amplitude $a_D$ of the other is the minimum. That is, the phases of the periods T of the adjacent wave surfaces are shifted by 180°. Here, the amplitude $a_D$ of the wave surface is the amplitude with respect to the arrangement direction (the axis direction Z) of the grooves 12. Both side surfaces Sa of the grooves 12 are, for example, orthogonal or inclined with respect to the forming surface of the roll original recording 11 and from the point of view of improving the anti-reflection characteristic of the optical element 1, inclined is preferable.

The average ratio $R_{w/tp}$ of the maximum width $w_{max}$ of the grooves 12 with respect to the pitch tp of the grooves 12 is preferably in a range of 0.4 or more to 0.8 or less, more preferably more than 0.5 to 0.8 or less, and even more preferably more than 0.5 to 0.7 or less. When the average ratio $R_{w/tp}$ is 0.4 or more, it is possible to obtain an excellent anti-reflection characteristic in the optical element 1. When the average ratio $R_{w/tp}$ is 0.8 or less, it is possible to impart suitable retardation to the optical element 1 as a phase compensation element for a projector apparatus or the like. Here, in a case where the average ratio $R_{w/tp}$ is more than 0.5, at a position where the width w of the groove 12 of one out of two adjacent grooves 12 is the widest, the width w of the other groove 12 is preferably the narrowest. This is because, by adopting such a configuration, it is possible to improve the filling ratio of the grooves 12 without two adjacent grooves 12 overlapping even in a case where the average ratio $R_{w/tp}$ is more than 0.5. Here, the maximum width $w_{max}$ of the grooves 12 has the meaning of the maximum value of the width w of the grooves 12.

The average ratio $R_{w/tp}$ of the maximum width $w_{max}$ of the grooves 12 with respect to the pitch tp of the grooves 12 is determined using the same method as the average ratio $R_{w/tp}$ of the maximum width $w_{max}$ of the structural bodies 3 with respect to the pitch tp of the structural bodies 3.

The depth h of the grooves 12 is either constant or changing with respect to the extension direction (the circumference direction T) of the grooves 12, and from the point of view of improving the anti-reflection characteristic of the optical element 1, changing is preferable. Here, FIG. 4B shows an example where the depth d of the grooves 12 changes with respect to the extension direction (the circumference direction T) of the grooves 12. The changing periods of the width w and the depth d of the grooves 12 are preferably synchronized from the point of view of improving the anti-reflection characteristic of the optical element 1. In such a case, the width w of the grooves 12 is the maximum at a position where the depth d of the grooves 12 is the maximum and the width w of the grooves 12 is the minimum at a position where the depth d of the grooves 12 is the minimum.

The bottom surface Sb of the grooves 12 is a flat surface or a wave surface, and from the point of view of improving the anti-reflection characteristic of the optical element 1, the wave surface is preferable. Here, FIG. 4B shows an example where the bottom surface Sb of the grooves 12 is a wave surface. In a case where the bottom surface Sb of the grooves 12 is a wave surface, the wave surface is a wave surface which vibrates periodically at the amplitude $a_R$ in the depth direction (the radial direction R) of the grooves 12. The vibration periods of the wave surface of the bottom surface Sb and the wave surface of both side surfaces Sa are preferably synchronized from the point of view of improving the anti-reflection characteristic. In such a case, the amplitude $a_D$ of the wave surface of both side surfaces Sa is the maximum at a position where the amplitude $a_R$ of the wave surface of the bottom surface Sb is the maximum and the amplitude $a_D$ of the wave surface of both side surfaces Sa is the minimum at a position where the amplitude $a_R$ of the wave surface of the bottom surface Sb is the minimum.

The grooves 12, for example, have a shape which is symmetrical with respect to the plane (the TR plane) which includes the circumference direction T and the radial direction R. Accordingly, in the plane (the ZR plane) which includes the axis direction Z and the radial direction R, the shape of a cross section (a ZR cross section) which is cut away in grooves 12 has, for example, a shape which is line-symmetrical with respect to an axis which is parallel with the radial direction R as shown in FIG. 4C. As the specific cross-sectional shape thereof, the same shapes as the cross-sectional shape of the structural bodies described above may be exemplified.

Configuration of Exposure Apparatus

Figure 5:
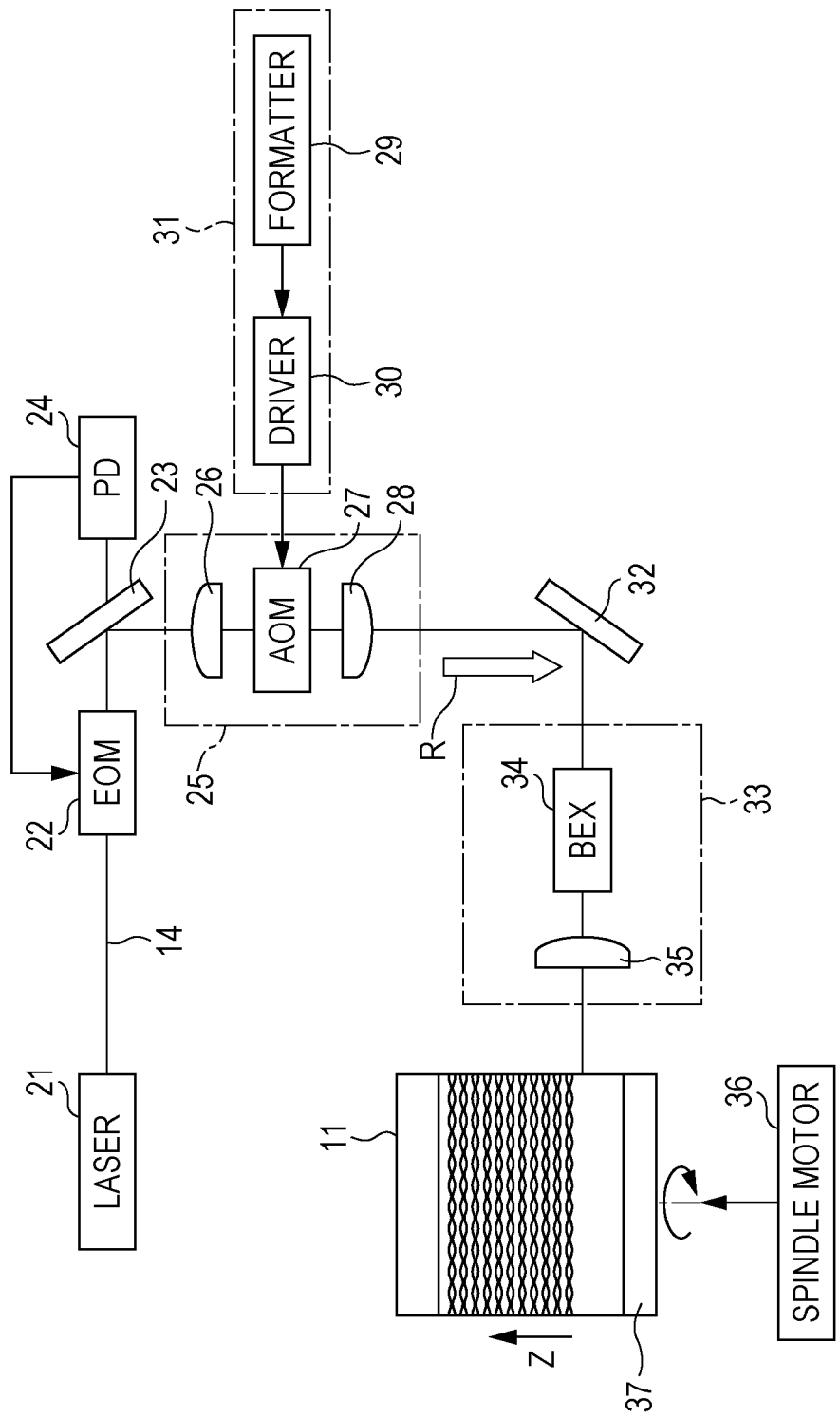
FIG. 5 is a schematic diagram which shows an example of the configuration of a roll original recording exposure apparatus.

FIG. 5 is a schematic diagram which shows an example of the configuration of a roll original recording exposure apparatus for manufacturing the roll original recording. This roll original recording exposure apparatus is configured with an optical disc original recording exposure apparatus as a base.

A laser light source 21 is a light source for exposing a resist layer which is deposited on the surface of the roll original recording 11 as a recording medium, for example, a light source which oscillates a laser beam 14 for recording where a wavelength $\lambda=266$ nm. The laser beam 14 which is emitted from the laser light source 21 remains straight as a parallel beam and is incident to an electro optical modulator (EOM) 22. The laser beam 14 which is transmitted through the electro optical modulator 22 is guided to a modulation optical system 25 by being reflected by a mirror 23.

The mirror 23 is configured by a polarization beam splitter and has a function of reflecting one polarization component and transmitting the other polarization component. The polarization component which is transmitted by the mirror 23 is received by a photodiode 24 and the laser beam 14 is phase modulated by controlling the electro optical modulator 22 based on the received signal.

In the modulation optical system 25, the laser beam 14 is condensed onto an acousto-optic modulator (AOM) 27 formed of glass ($SiO_2$) or the like using a condenser lens 26. The laser beam 14 is formed into parallel beams by a lens 28 after being made to diverge by strength modulation using the acousto-optic modulator 27. The laser beam 14 which is emitted from the modulation optical system 25 is guided horizontally and in parallel onto a moving optical table 33 by being reflected by a mirror 32.

The moving optical table 33 is provided with a beam expander 34 and an objective lens 35. The laser beam 14 which is guided to the moving optical table 33 is irradiated onto a resist layer on the roll original recording 11 via the objective lens 35 after being shaped into a desired beam shape by the beam expander 34. The roll original recording 11 is placed on a turntable 37 which is connected with a spindle motor 36. Then, the exposure step of the resist layer is performed by irradiating the laser beam 14 onto the resist layer while moving the laser beam 14 in the axis direction Z of the roll original recording 11 along with rotating the roll original recording 11. The movement of the laser beam 14 is performed by moving in the direction of the arrow R in the moving optical table 33.

The roll original recording exposure apparatus is provided with a control mechanism 31 for forming a latent image which corresponds to the shape pattern of the grooves 12 of the roll original recording 11 described above on the resist layer. The control mechanism 31 is provided with a formatter 29 and a driver 30. The formatter 29 is provided with a polarity inversion section, and the polarity inversion section controls the irradiation timing of the laser beam 14 with respect to the resist layer. The driver 30 controls the acousto-optic modulator 27 by receiving the output from the polarity inversion section.

In the roll original recording exposure apparatus, a signal is generated by synchronizing the polarity inversion formatter signal and a rotation controller for each track such that the shape pattern of the latent image is spatially linked and the strength of the generated signal is modulated by the acousto-optic modulator 27. By patterning at a constant angular velocity (CAV) with a suitable number of rotations, a suitable modulation frequency, and a suitable feeding pitch, it is possible to record the shape pattern of the latent image.

Method of Manufacturing Optical Element

FIG. 6A to FIG. 7D are step diagrams for describing an example of a method of manufacturing the optical element according to the first embodiment of the present technology.

Resist Film Forming Step

Figure 6A:
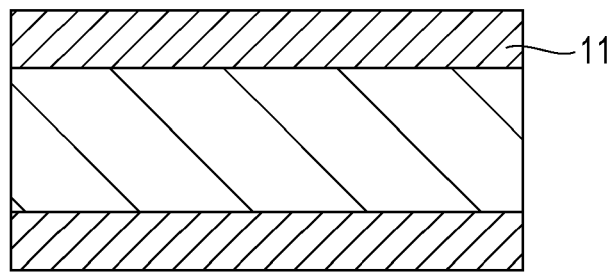
FIG. 6A to 6C are step diagrams for describing an example of a method of manufacturing the optical element according to the first embodiment of the present technology.
Figure 6B:
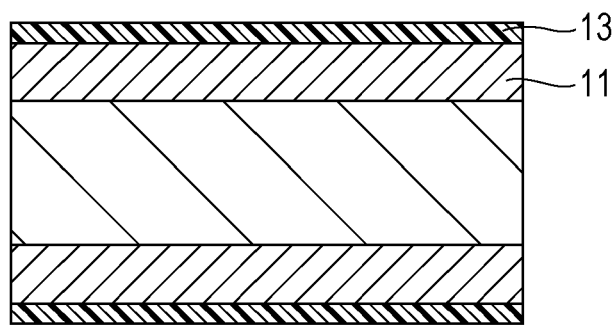

Firstly, as shown in FIG. 6A, the roll original recording 11 with a columnar shape or cylindrical shape is prepared. The roll original recording 11 is, for example, a glass original. Next, as shown in FIG. 6B, a resist layer 13 is formed on the surface of the roll original recording 11. As the material of the resist layer 13, for example, either an organic resist or an inorganic resist may be used. It is possible to use, for example, a Novolac resist, a chemically amplified resist, or the like as the organic resist. In addition, it is possible to use, for example, a metal compound as the inorganic resist.

Exposure Step

Figure 6C:
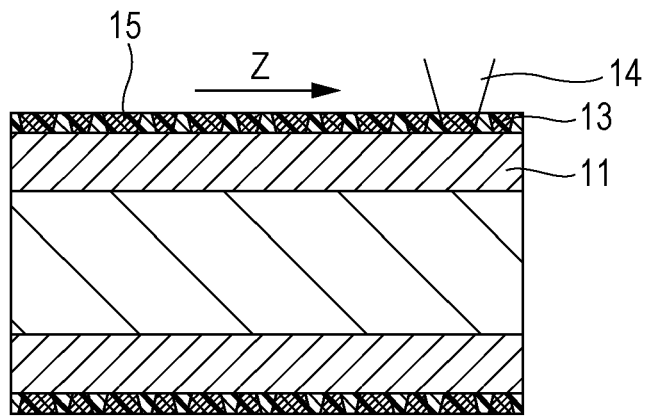

Next, as shown in FIG. 6C, the laser beam (the exposure beam) 14 is irradiated onto the resist layer 13 which is formed on the surface of the roll original recording 11. Specifically, the roll original recording 11 is placed onto the turntable 37 of the roll original recording exposure apparatus shown in FIG. 5 and the laser beam (the exposure beam) 14 is irradiated onto the resist layer 13 along with rotating the roll original recording 11. At this time, the entire surface of the resist layer 13 is exposed by irradiating the laser beam 14 while moving the laser beam 14 in the axis direction (the height direction) Z of the roll original recording 11. Due to this, a latent image 15 according to trajectory of the laser beam 14 is formed across the entire surface of the resist layer 13. The latent image 15 has, for example, a shape which corresponds to the shape of the plurality of grooves 12 of the roll original recording 11.

Development Step

Figure 7A:
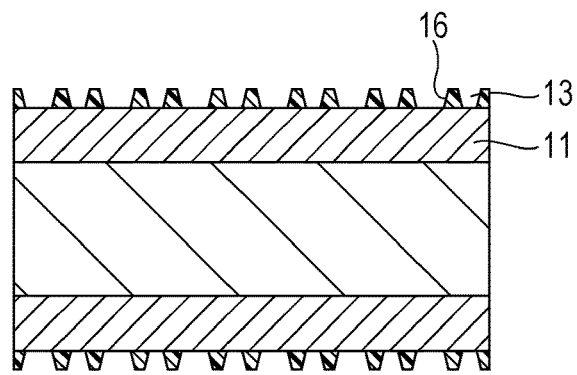
FIG. 7A to FIG. 7D are step diagrams for describing an example of a method of manufacturing the optical element according to the first embodiment of the present technology.

Next, for example, a development treatment is performed on the resist layer 13 by dropping a developer onto the resist layer 13 while rotating the roll original recording 11. Due to this, as shown in FIG. 7A, a plurality of opening sections 16 are formed in the resist layer 13. In a case where the resist layer 13 is formed by a positive type resist, since the dissolving speed of the exposed sections, which are exposed to the laser beam 14, with respect to the developer is increased in comparison with the unexposed sections, a pattern according to the latent image (exposed section) 15 is formed on the resist layer 13 as shown in FIG. 7A.

Etching Step

Figure 7B:
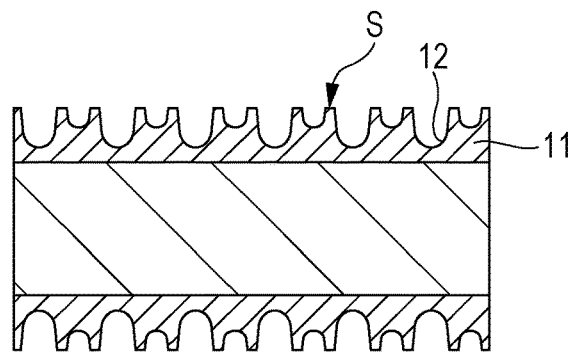

Next, a pattern (a resist pattern) of the resist layer 13 which is formed on the surface of the roll original recording 11 is set as a mask and an etching treatment is performed on the columnar surface or the cylindrical surface of the roll original recording 11. Due to this, as shown in FIG. 7B, for example, a plurality of grooves 12 which extend in the circumference direction on the columnar surface or the cylindrical surface of the roll original recording 11 are formed. That is, the forming surface S of the roll original recording 11 is formed. It is possible to use, for example, dry etching or wet etching as the etching. By alternately performing the etching treatment and an ashing treatment, grooves 12 which have a cross section (a ZR cross section) which is substantially U-shaped, substantially parabolic shaped, or the like may be set to be formed, for example. Due to this, it is possible to obtain the desired roll original recording 11.

Optical Element Manufacturing Step

Figure 7C:
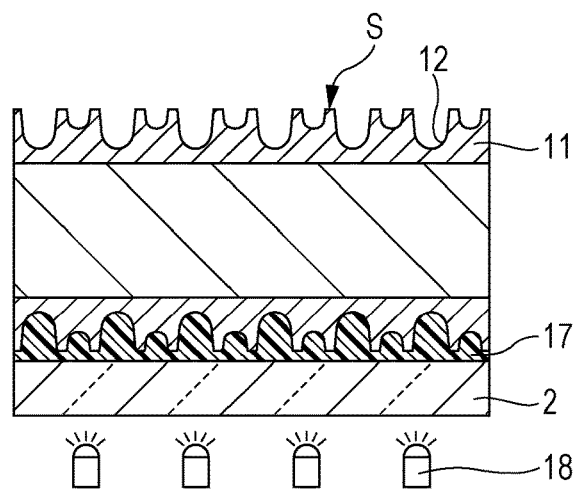
Figure 7D:
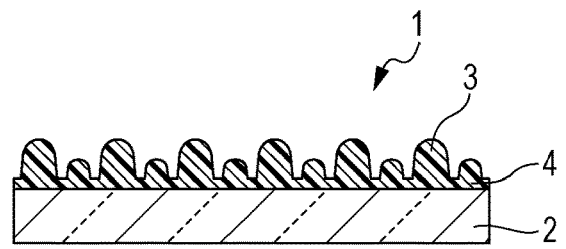

Next, as shown in FIG. 7C, while rotating the roll original recording 11, the forming surface S of the roll original recording 11 and a transfer material 17 which is coated on the surface of the substrate 2 with a strip shape are bonded, and the transfer material 17 is cured by the irradiation of energy rays such as ultraviolet rays from an energy source 18 onto the transfer material 17. Next, while maintaining the rotation of the roll original recording 11, the substrate 2 which is integral with the cured transfer material 17 is peeled off the forming surface S of the roll original recording 11. Due to this, as shown in FIG. 7D, a strip shaped optical element 1 is obtained by sequentially forming a plurality of structural bodies 3 on the surface of the strip shaped substrate 2. At this time, the intermediate layer 4 may be set to be formed between the structural bodies 3 and the substrate 2 according to necessity.

The energy source 18 is not particularly limited as long as it is able to emit energy rays which are able to cure the transfer material 17. Examples of the energy rays include electron beams, ultraviolet rays, infrared rays, laser beams, visible light, ionizing radiation (x-rays, $\alpha$ rays, $\beta$ rays, $\gamma$ rays, and the like), microwaves, high-frequency waves, or the like.

It is preferable to use an energy ray-curable resin composition as the transfer material 17. It is preferable to use an ultraviolet-curable resin composition as the energy ray-curable resin composition. The energy ray-curable resin composition may include fillers, functional additives, or the like according to necessity.

The ultraviolet-curable resin composition includes, for example, an acrylate and an initiator. The ultraviolet-curable resin composition may include, for example, a monofunctional monomer, a bifunctional monomer, a polyfunctional monomer, and the like, specifically, one or a mixture of a plurality of the materials which are shown below.

Examples of monofunctional monomers include carboxylic acids (acrylic acid), hydroxy acids (2-hydroxyethyl acrylate, 2-hydroxypropyl acrylate, and 4-hydroxybutyl acrylate), alkyl, alicyclic acids (isobutyl acrylate, t-butyl acrylate, isooctyl acrylate, lauryl acrylate, stearyl acrylate, isobornyl acrylate, and cyclohexyl acrylate), other functional monomers (2-methoxyethyl acrylate, methoxyethylene glycol acrylate, 2-ethoxyethyl acrylate, tetrahydrofurfuryl acrylate, benzyl acrylate, ethylcarbitol acrylate, phenoxy ethyl acrylate, N,N-dimethylaminoethyl acrylate, N,N-dimethylaminopropyl acrylamide, N,N-dimethylacrylamide, acryloylmorpholine, N-isopropyl acrylamide, N,N-diethyl acrylamide, N-vinyl pyrrolidone, 2-(perfluorooctyl)ethyl acrylate, 3-perfluoro-hexyl-2-hydroxypropyl acrylate, 3-perfluorooctyl-2-hydroxypropyl acrylate, 2-(perfluorodecyl)ethyl acrylate, 2-(perfluoro-3-methylbutyl)ethyl acrylate), 2,4,6-tribromophenol acrylate, 2,4,6-tribromophenol methacrylate, 2-(2,4,6-tribromophenoxy)ethyl acrylate), 2-ethylhexyl acrylate, and the like.

Examples of the bifunctional monomers include tri(propylene glycol) diacrylate, trimethylolpropane diallyl ether, urethane acrylate, and the like.

Examples of the polyfunctional monomers include trimethylol propane triacrylate, dipentaerythritol penta and hexaacrylate, ditrimethylolpropane tetraacrylate, and the like.

Examples of the initiator include 2,2-dimethoxy-1,2-diphenyl ethane-1-one, 1-hydroxy-cyclohexyl phenyl ketone, 2-hydroxy-2-methyl-1-phenylpropane-1-one, and the like.

As fillers, it is possible to use inorganic fine particles and organic fine particles. Examples of the inorganic fine particles include fine particles which include metal oxides. As the metal oxides, it is possible to use one type or more which is selected from a group formed of silicon oxide ($SiO_2$), titanium oxide ($TiO_2$), zirconium oxide ($ZrO_2$), tin oxide ($SnO_2$), aluminum oxide ($Al_2O_3$).

Examples of the functional additives include leveling agents, surface adjusting agents, anti-foaming agents, and the like. Examples of the material of the substrate 2 include methyl methacrylate (co)polymers, polycarbonate, styrene (co)polymers, methyl methacrylate-styrene copolymers, cellulose diacetate, cellulose triacetate, cellulose acetate butyrate, polyester, polyamide, polyimide, polyether sulfone, polysulfone, polypropylene, polymethylpentene, polyvinyl chloride, polyvinyl acetal, polyether ketone, polyurethane, glass, and the like.

The method of forming the substrate 2 is not particularly limited, and any methods of an injection forming method, an extrusion forming method, and a cast forming method may be used. According to necessity, a surface treatment such as a corona treatment may be set to be performed on the substrate surface.

From the point of view of improving the releasing of the roll original recording 11, it is preferable to coat a release agent such as a silicone-based mold release agent or a fluorine-based release agent on the surface of the roll original recording 11, or to add an additive such as a fluorine-based additive or a silicone-based additive to the transfer material 17.

Cutting Out Step

Next, according to necessity, a plurality of optical elements 1 which have a rectangular shape are cut out from the strip shaped optical element 1. At this time, by selecting the angle of the cutting out with respect to the longitudinal direction of the strip shaped optical element 1, it is possible to select the directions of the slow axis and the fast axis of the optical element 1.

By the above, it is possible to obtain the desired optical element 1.

Effects

A plurality of structural bodies 3 are provided on the surface of the substrate 2 in the optical element 1 according to the first embodiment. Since the plurality of structural bodies 3 extend in the X axis direction (the first direction) and are arranged periodically at a pitch tp of a sub-wavelength in the Y axis direction (the second direction) which intersects with the X axis direction (the first direction) which is the extension direction, it is possible to impart a phase compensation function to the optical element 1. In addition, since the width of the plurality of structural bodies 3 which extend in the X axis direction (the first direction) changes periodically, it is possible to impart an anti-reflection function to the optical element 1. Accordingly, it is possible to provide the optical element 1 which has both a phase compensation function and an anti-reflection function.

MODIFIED EXAMPLES

First Modified Example

In the first embodiment described above, description was given of an example where the substrate 2 and the structural bodies 3 were formed separately; however, the substrate 2 and the structural bodies 3 may be formed integrally. In such a case, the substrate 2 and the structural bodies 3 are configured with the same energy ray-curable resin composition, heat-curable resin, thermoplastic resin, or the like.

Second Modified Example

In the first embodiment described above, description was given of an example where the optical element 1 was formed using an energy ray-curable resin as the transfer material 17; however, the optical element 1 may be manufactured using a heat-curable resin or a thermoplastic resin as the transfer material 17.

In a case where a heat-curable resin is used as the transfer material 17, for example, it is possible to manufacture the optical element 1 in the following manner. Firstly, while rotating the roll original recording 11, the forming surface S of the roll original recording 11 is pressed onto the transfer material 17 which is coated on the surface of the strip shaped substrate 2 and the heat-curable resin is heated to the curing temperature and cured using the roll original recording 11. Next, while maintaining the rotation of the roll original recording 11, the substrate 2 which is integral with the cured transfer material 17 is peeled off the forming surface S of the roll original recording 11.

In a case where a thermoplastic resin is used as the transfer material 17, it is possible to manufacture the optical element 1 in the following manner. Firstly, while rotating the roll original recording 11, the forming surface S of the roll original recording 11 is pressed onto the strip shaped substrate 2 formed of the transfer material 17 and, for example, the substrate 2 is heated to near the glass transition point thereof or more. Next, while maintaining the rotation of the roll original recording 11, the substrate 2 which is integral with the cured transfer material 17 is peeled off the forming surface S of the roll original recording 11.

Here, in a case where the optical element 1 is manufactured in the manner described above, as the roll original recording 11, it is possible to use a roll original recording which is configured to be able to heat a heat-curable resin or a thermoplastic resin, which is bonded to the forming surface S of the roll original recording 11, by a heat source such as a heater being provided therein.

Third Modified Example

In the first embodiment described above, description was given of an example of a case of using a substrate which has optical isotropy as the substrate 2; however, a substrate which has birefringence may be used as the substrate 2. In such a case, from the point of view of increasing the in-plane retardation, it is preferable that the direction of the slow axis of the substrate 2 and the extension direction (the X axis direction) of the structural bodies 3 be parallel. It is possible to use, for example, a phase difference film or the like which is in the related art as the substrate 2 which has birefringence. This phase difference film preferably has phase difference stability, in-plane optical axis direction stability, high transmittance, a bonding property, and the like. In addition, the phase difference film preferably also has characteristics such as high heat resistance, low water absorption, and a low optical elastic modulus. Examples of films which satisfy these characteristics include norbornene-based films, polycarbonate (PC) films, cellulose triacetate films, polymethyl methacrylate (PMMA) films, and the like. After obtaining the optical element 1 by forming the structural bodies 3 on the surface of the substrate 2, the retardation may be adjusted by extending the optical element 1 in the extension direction of the structural bodies 3 (the X axis direction).

2. Second Embodiment

Configuration of Projection Type Image Display Apparatus

Figure 8:
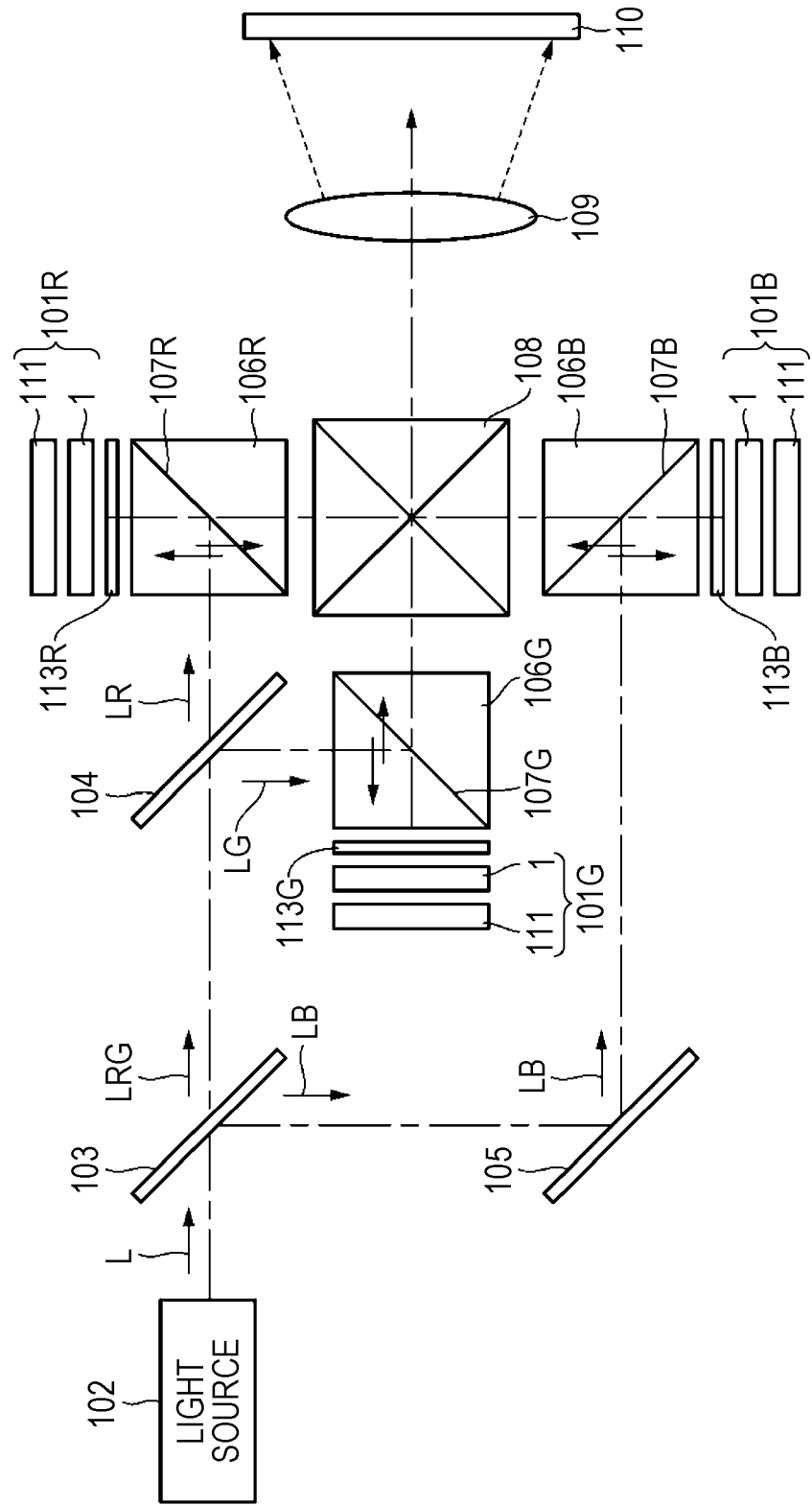
FIG. 8 is a schematic diagram which shows an example of the configuration of a projection type image display apparatus according to a second embodiment of the present technology.

FIG. 8 is a schematic diagram which shows an example of the configuration of a projection type image display apparatus according to a second embodiment of the present technology. The projection type image display apparatus 115A is a so-called three-plate type liquid crystal projector apparatus which performs color image display using three liquid crystal light valves of each color of red, green and blue. As shown in FIG. 8, the projection type image display apparatus 115A is provided with liquid crystal display apparatuses 101R, 101G, and 101B, a light source 102, dichroic mirrors 103, and 104, a total reflection mirror 105, polarization beam splitters 106R, 106G, and 106B, a synthesis prism 108, and a projection lens 109.

The light source 102 emits a light source light (white light) L which includes blue light LB, green light LG, and red light LR which are necessary for the color image display, and, for example, a halogen lamp, a metal halide lamp, a xenon lamp, or the like is provided.

The dichroic mirror 103 has a function of separating the light source light L into the blue light LB and the other color light LRG. The dichroic mirror 104 has a function of separating the light LRG which is transmitted by the dichroic mirror 103 into the red light LR and the green light LG. The total reflection mirror 105 reflects the blue light LB which is separated by the dichroic mirror 103 toward the polarization beam splitter 106B.

The polarization beam splitters 106R, 106G, and 106B are each prism type polarization separating elements which are provided along the light path of the red light LR, the green light LG, and the blue light LB. The polarization beam splitters 106R, 106G, and 106B respectively have polarization separating surfaces 107R, 107G, and 107B and the polarization separating surfaces 107R, 107G, and 107B have functions of separating two polarization components where each of the incident color lights intersect with each other. The polarization separating surfaces 107R, 107G, and 107B reflect one polarization component (for example, the S polarization component) and transmit the other polarization component (for example, the P polarization component).

The color lights of predetermined polarization components (for example, the S polarization component) which are separated by the polarization separating surfaces 107R, 107G, and 107B of the polarization beam splitters 106R, 106G, and 106B are incident to the liquid crystal display apparatuses 101R, 101G, and 101B. The liquid crystal display apparatuses 101R, 101G, and 101B are driven according to a driving voltage which is applied based on an image signal to modulate the incident light and have a function of reflecting the modulated light toward the polarization beam splitters 106R, 106G, and 106B.

¼ wave plates 113R, 113G, and 113B and the optical element 1 are respectively arranged between the polarization beam splitters 106R, 106G, and 106B and each liquid crystal panel 111 of the liquid crystal display apparatuses 101R, 101G, and 101B. The ¼ wave plates 113R, 113G, and 113B have a function of correcting decreases in contrast which are caused by the angular dependence of the incident light of the polarization beam splitters 106R, 106G, and 106B. The optical element 1 has a function of compensating the residual phase difference of the liquid crystal panels which configure the liquid crystal display apparatuses 101R, 101G, and 101B.

The synthesis prism 108 has a function of synthesizing color light of the predetermined polarization component (for example, the P polarization component) which is emitted from the liquid crystal display apparatuses 101R, 101G, and 101B and transmitted by the polarization beam splitters 106R, 106G, and 106B. The projection lens 109 has a function of projecting the synthesized light which is emitted from the synthesis prism 108 toward a screen 110.

Operation of Projection Type Image Display Apparatus

Next, description will be given of the operation of the projection type image display apparatus 115A which is configured as above.

Firstly, white light L which is emitted from the light source 102 is separated into blue light LB and the other color lights (red light and green light) LRG by the function of the dichroic mirror 103. Out of these, the blue light LB is reflected toward the polarization beam splitter 106B by the function of the total reflection mirror 105.

On the other hand, the other color lights (red light and green light) LRG are further separated into the red light LR and the green light LG by the function of the dichroic mirror 104. The separated red light LR and green light LG are respectively incident to the polarization beam splitters 106R and 106G.

The polarization beam splitters 106R, 106G, and 106B separate each of the incident color lights into two polarization components which intersect with each other in the polarization separating surfaces 107R, 107G, and 107B. At this time, the polarization separating surfaces 107R, 107G, and 107B reflect one polarization component (for example, the S polarization component) toward the liquid crystal display apparatuses 101R, 101G, and 101B. The liquid crystal display apparatuses 101R, 101G, and 101B are driven according to a driving voltage which is applied based on an image signal to modulate the color lights of the predetermined polarization component which is incident by pixel units.

The liquid crystal display apparatuses 101R, 101G, and 101B reflect each of the modulated color lights toward the polarization beam splitters 106R, 106G, and 106B. The polarization beam splitters 106R, 106G, and 106B transmit only the predetermined polarization components (for example, the P polarization component) out of the reflected light (the modulated light) from the liquid crystal display apparatuses 101R, 101G, and 101B, which are emitted toward the synthesis prism 108.

The synthesis prism 108 synthesizes the color light of the predetermined polarization components which are transmitted by the polarization beam splitters 106R, 106G, and 106B, which is emitted toward the projection lens 109. The projection lens 109 projects the synthesized light which is emitted from the synthesis prism 108 toward the screen 110. Due to this, a color image according to the light which is modulated by the liquid crystal display apparatuses 101R, 101G, and 101B is projected onto the screen 110 and the desired video display is realized.

Modified Example

Figure 9:
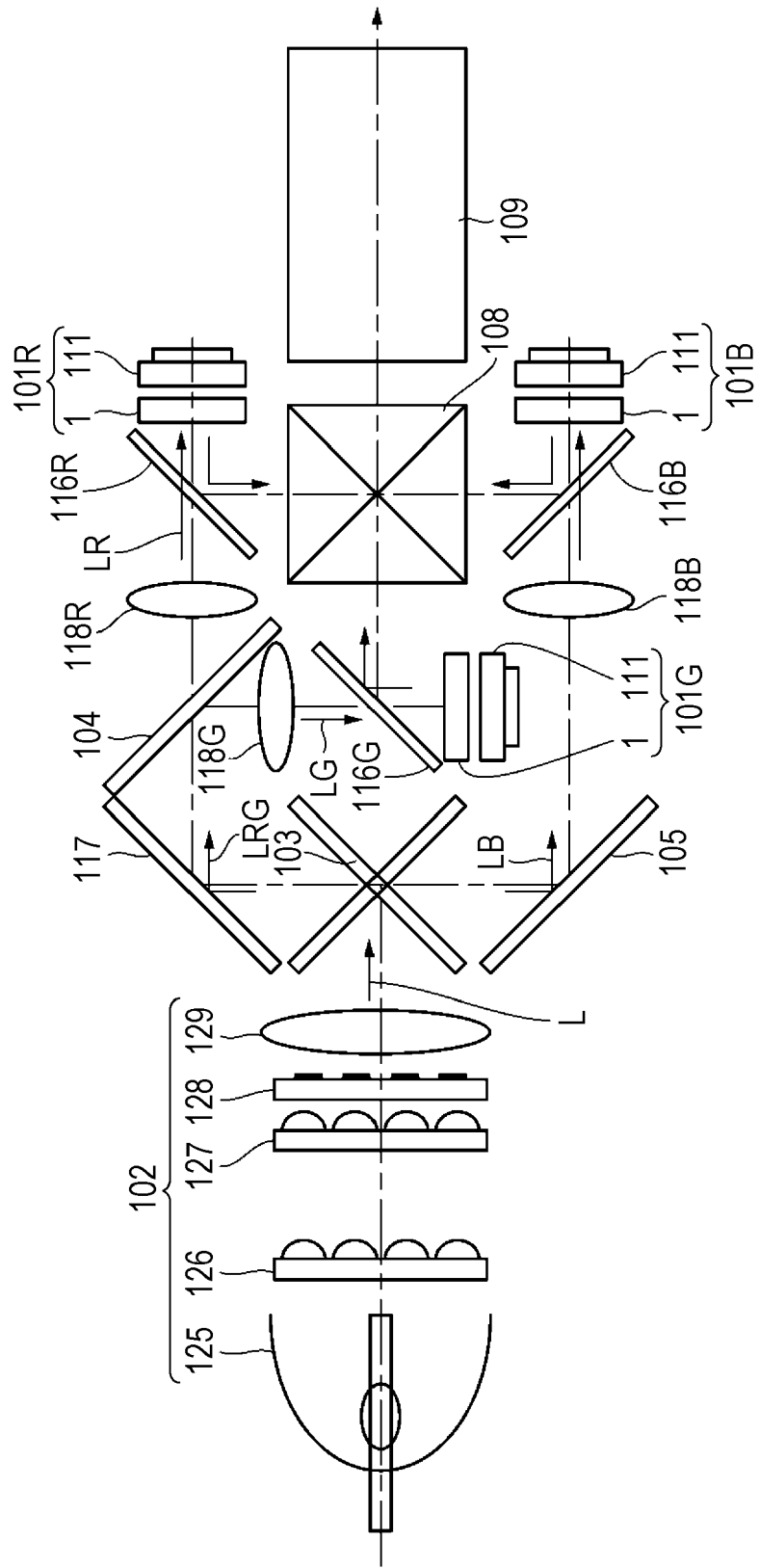
FIG. 9 is a schematic diagram which shows another configuration example of the projection type image display apparatus according to the second embodiment of the present technology.

FIG. 9 is a schematic diagram which shows another configuration example of the projection type image display apparatus according to the second embodiment of the present technology. A projection type image display apparatus 115B is provided with wire grid polarizers 116R, 116G, and 116B as the polarization separation elements instead of the prism type polarization beam splitters 106R, 106G, and 106B shown in FIG. 8. Here, the same reference numerals are given to the portions which correspond to the projection type image display apparatus shown in FIG. 8.

Since the angular dependence of the incident light is small and the heat resistance is excellent for the wire grid polarizers 116R, 116G, and 116B in comparison with the prism type polarization beam splitters 106R, 106G, and 106B, the ¼ wave plates are not necessary, and it is possible to suitably use the wire grid polarizers 116R, 116G, and 116B as the polarization separation elements for the projection type image display apparatus 115B which uses the light source 102 with a large amount of light. Also, in the projection type image display apparatus 115B, images are displayed on the screen (not shown) by a similar operation to the projection type image display apparatus 115A which is shown in FIG. 8.

The projection type image display apparatus 115B is further provided with a total reflection mirror 117, and relay lenses 118R, 118G, and 118B. The total reflection mirror 117 reflects the light LRG which is separated by the dichroic mirror 103 toward dichroic mirrors 1 to 4. The relay lens 118R is provided in the optical path of the wire grid polarizer 116R from the dichroic mirror 104. The relay lens 118G is provided in the optical path of the wire grid polarizer 116G from the dichroic mirror 104. The relay lens 118B is provided in the optical path of the wire grid polarizer 116B from the total reflection mirror 105.

FIG. 9 shows a configuration example of the light source 102. The light source 102 is provided with a lamp unit 125 which generates a light source light L, a pair of micro lens arrays 126 and 127 which make the brightness of the light source light L uniform, a PS conversion element 128 which converts the polarization direction of the light source light L to a polarized wave in one direction, and a position adjusting lens 129 which adjusts the irradiation position of the light source light L.

In the wire grid polarizers 116R, 116G, and 116B, a plurality of thin metal wires where the pitch, the width, and the height are smaller than the wavelength of the incident light are formed in a lattice on a transparent substrate such as glass. The wire grid polarizers 116R, 116G, and 116B which have this configuration reveal the predetermined polarization characteristic by reflecting the polarization component which is parallel to the thin metal wires and transmitting the polarization component which intersects with the thin metal wires. The wire grid polarizers 116R, 116G, and 116B function as polarizers in a case of being arranged orthogonally with respect to the incident light. On the other hand, in a case of being arranged non-orthogonally with respect to the incident light as shown in FIG. 9, the wire grid polarizers 116R, 116G, and 116B function as polarization beam splitters. In addition, in a case where the wire grid polarizers 116R, 116G, and 116B are used as polarization beam splitters, the polarization plates are not necessary in the liquid crystal display apparatus.

Liquid Crystal Display Apparatus

Figure 10:
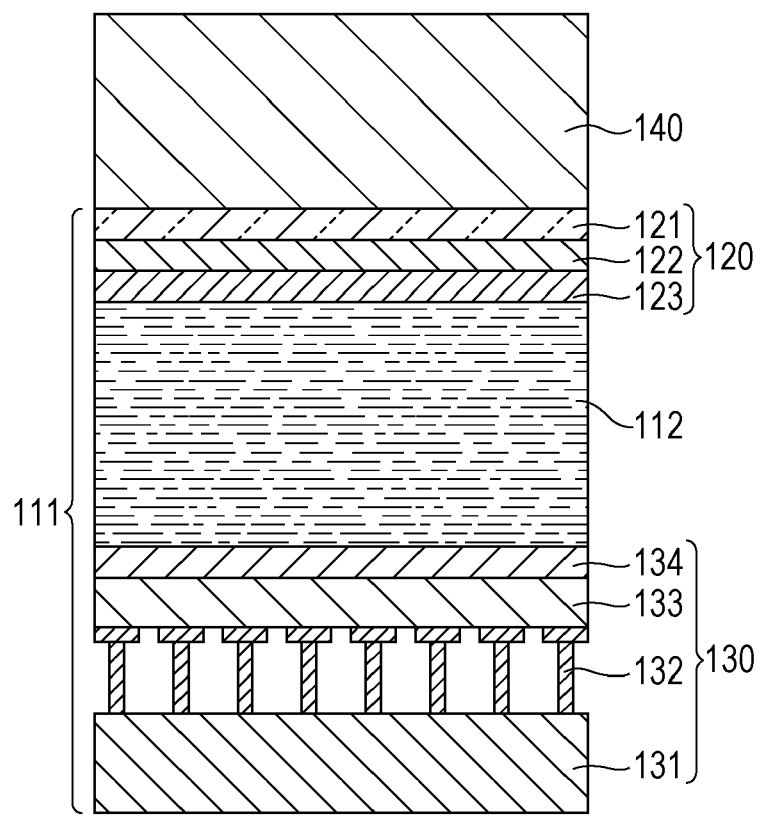
FIG. 10 is a cross-sectional diagram which shows an example of a configuration of the liquid crystal display apparatus which is shown in FIG. 8 and FIG. 9.

FIG. 10 is a cross-sectional diagram which shows an example of a configuration of the liquid crystal display apparatus which is shown in FIG. 8 and FIG. 9. As shown in FIG. 10, the liquid crystal display apparatuses 101R, 101G, and 101B are provided with a liquid crystal panel 111 which is a light valve, and the optical element 1 which is provided on the surface of the liquid crystal panel 111. The optical element 1 is provided on the surface of the side where the polarization beam splitters 106R, 106G, and 106B or the wire grid polarizers 116R, 116G, and 116B are arranged to face each other out of the surfaces of the liquid crystal panel 111.

The liquid crystal panel 111 is a reflective, orthogonally-aligned liquid crystal display element where liquid crystal molecules are aligned orthogonally in a state where voltage is not applied, and is provided with a counter substrate 120 and a pixel electrode substrate 130 which are arranged to face each other, and a liquid crystal layer 112 where liquid crystal is sealed between the counter substrate 120 and the pixel electrode substrate 130. As the liquid crystal which configures the liquid crystal layer 112, it is possible to use a liquid crystal which has negative dielectric anisotropy, for example, a nematic liquid crystal which has negative dielectric anisotropy.

The counter substrate 120 is configured by sequentially laminating a transparent electrode 122 and an alignment film 123 on a transparent substrate 121. The transparent substrate 121 is a glass substrate formed of, for example, soda glass, non-alkali glass, quartz glass, or the like. The transparent electrode 122 is formed of a transparent conductive oxide material such as Indium Tin Oxide (ITO) which is a solid solution of tin oxide ($SnO_2$) and indium oxide ($In_2O_3$). The transparent electrode 122 is set to a potential (for example, a ground potential) which is common in all of the pixel regions.

The alignment film 123 is formed of, for example, a polyimide organic compound. A rubbing treatment is carried out on the surface of the liquid crystal layer 112 side of the alignment film 123 in order to align the liquid crystal molecules which configure the liquid crystal layer 112 in a predetermined direction.

The pixel electrode substrate 130 is configured by sequentially laminating a reflective electrode layer 133 and an alignment film 134 on a support substrate 131. The support substrate 131 is, for example, a silicon substrate, and, for example, a Complementary Metal Oxide Semiconductor (C-MOS) type switching element 132 is provided on the support substrate 131. The reflective electrode layer 133 is provided with a plurality of reflective type pixel electrodes. A driving voltage is set to be applied to the pixel electrodes by the switching element 132 described above.

As the material which configures the pixel electrodes, material which has high reflectivity in visible light is preferable, for example, aluminum may be used. The alignment film 134 is formed of, for example, a polyimide organic compound in the same manner as the alignment film 123 of the counter substrate 120, and a rubbing treatment is carried out on the surface of the liquid crystal layer 112 side of the alignment film 134 in order to align the liquid crystal molecules which configure the liquid crystal layer 112 in a predetermined direction.

Optical Element

The optical element 1 is respectively provided between the polarization beam splitters 106R, 106G, and 106B or the wire grid polarizers 116R, 116G, and 116B and the front surface of the liquid crystal panel 111 (FIG. 8 and FIG. 9). By rotating the optical element 1 with an axis which is orthogonal to the liquid crystal panel 111 as the rotation axis and appropriately setting the rotation angle of the slow axis of each of the optical elements 1 with respect to the slow axis of the liquid crystal panel 111, it is possible to adjust the contrast. The optical element 1 according to the first embodiment described above may be used as the optical element 1.

The optical element 1 has a function of compensating the phase difference due to the pre-tilt of the liquid crystal molecules. The optical element 1 is a phase difference element which has a small in-plane phase difference and a negative orthogonal direction phase difference.

The optical element 1 further has a function of preventing the reflection of incident light (for example, red light, green light, and blue light). The reflectivity of the optical element 1 with respect to the incident light is preferably set to 1% or less. By setting the reflectivity to 1% or less, it is possible to suppress a decrease in the contrast due to the reflected light.

Here, the projection type image display apparatuses 115A and 115B may be provided with a phase difference compensation device instead of the optical element 1. As the phase difference compensation device, for example, it is possible to use that disclosed in Japanese Unexamined Patent Application Publication No. 2008-70666 and Japanese Unexamined Patent Application Publication No. 2007-11280 described above. In such a case, the optical element 1 according to the first embodiment may be used instead of the phase difference plate where the phase difference compensation device is provided.

Effect

The projection type image display apparatuses 115A and 115B according to the second embodiment are provided with the optical element 1 which has both the phase compensation function and the anti-reflection function on the surface of the liquid crystal panel 111. Accordingly, it is possible to realize excellent contrast and it is possible to increase the use efficiency of the light source light L which is emitted from the light source 102.

EXAMPLES

Below, specific description will be given of embodiments of the present technology using Examples; however, the present technology is not limited to these Examples.

In the present embodiment, the average width $W_{max}$ of the structural bodies, the average pitch Tp, and the average ratio $R_{w/tp} (=\Sigma(W_{max}/tp)/n$: where n is the number of structural bodies where $W_{max}$ and tp are measured) were determined in the following manner.

Firstly, a Top View and Cross Section View of the surface of the optical film was imaged using a scanning type electron microscope (SEM). Next, a structural body was picked out at random from the imaged SEM photograph and the maximum width $w_{max}$ and pitch tp of the structural body were measured (refer to FIG. 2A and FIG. 2C). Next, the imaging and measuring procedure was repeated and the maximum width $w_{max}$ and the pitch tp were obtained for a total of ten structural bodies. Next, the maximum width $w_{max}$ and pitch tp were respectively simply averaged (arithmetically averaged) to determine the average width $W_{max}$ and the average pitch Tp of the structural bodies. Next, after determining the ratios ($w_{max}$/tp) for each of the total of ten structural bodies, the average ratio $R_{w/tp}$ was determined by simply averaging (arithmetically averaging) these ratios ($w_{max}$/tp).

Example 1

Sample 2-1

Firstly, a glass roll original recording with an outer diameter of 126 mm was prepared and a resist layer was deposited in the following manner on the columnar surface of the glass roll original recording. That is, a photoresist was diluted to 1/10 with a thinner and the resist layer was deposited by coating the diluted resist onto the columnar surface of the glass roll original recording with a thickness of approximately 70 mm using a dipping method. Next, a latent image was patterned on the resist layer by transporting the glass roll original recording as the recording medium to the roll original recording exposure apparatus shown in FIG. 5 and exposing the resist layer.

Next, the resist layer of the exposed portions was dissolved and developed by carrying out a developing treatment on the resist layer on the glass roll original recording. Specifically, the undeveloped glass roll original recording was placed onto a turntable of a developing device which is not shown in the diagram and the resist layer on the columnar surface was developed by dropping a developing solution onto the columnar surface of the glass roll original recording while rotating the turntable. Due to this, a glass roll original recording which had an opening pattern in the resist layer was obtained.

Next, plasma etching was performed in a $CHF_3$ gas atmosphere using a roll etching apparatus. Due to this, on the columnar surface of the glass roll original recording, the etching proceeded only for the portion which was exposed from the resist layer and the resist layer was a mask in other regions and etching was not performed, whereby a plurality of grooves were formed on the columnar surface of the glass roll original recording. The plurality of grooves had a striped shape which extended in the circumference direction of the columnar surface of the glass roll original recording as shown in FIG. 4A to FIG. 4C. In addition, the width of the grooves changed periodically and had a configuration where, at a position where one groove width out of two adjacent grooves was the widest, the other groove width was the narrowest. Here, the etching amount (the groove depth) was adjusted according to the etching time. Finally, the resist layer was completely removed by $O_2$ ashing.

Next, by using the glass roll original recording described above, a plurality of structural bodies were prepared on a strip shaped TAC (triacetyl cellulose) sheet using UV imprinting. Specifically, while rotating the glass roll original recording, the forming surface of the glass roll original recording and an ultraviolet-curable resin which was coated on the surface of the strip shaped TAC sheet were bonded, and the TAC sheet was peeled off from the glass roll original recording while curing the bonded portion thereof by irradiation with ultraviolet rays. As a result, the plurality of structural bodies were sequentially formed on the surface of the strip shaped TAC sheet. The structural bodies had a striped shape which extended in one direction (the longitudinal direction) on the TAC sheet surface as shown in FIG. 2A to FIG. 2C. In addition, the widths of these structural bodies changed periodically and had a configuration where, at a position where one structural body width out of two adjacent structural bodies was the widest, the other structural body width was the narrowest. The maximum width $W_{max}$, the average pitch Tp, and the average ratio $R_{w/tp}$ of the structural bodies were the values shown below.

Average maximum width $W_{max}$: 69 nm
Average pitch Tp: 173 nm
Average ratio $R_{w/tp}$: 0.4

By the above, it was possible to obtain the desired optical film.

Example 2

Next, an optical film was obtained in the same manner as Example 1 except that, by adjusting the conditions of the exposure step and the etching step, a plurality of structural bodies which had the average maximum width $W_{max}$ the average pitch Tp, and the average ratio $R_{w/tp}$ shown below were formed on the TAC sheet surface.

Average maximum width $W_{max}$: 87 nm
Average pitch Tp: 173 nm
Average ratio $R_{w/tp}$: 0.5

Example 3

Next, an optical film was obtained in the same manner as Example 1 except that, by adjusting the conditions of the exposure step and the etching step, a plurality of structural bodies which have the average maximum width $W_{max}$, the average pitch Tp, and the average ratio $R_{w/tp}$ shown below were formed on the TAC sheet surface.
Average maximum width $W_{max}$: 121 nm
Average pitch Tp: 173 nm
Average ratio $R_{w/tp}$: 0.7

Example 4

Next, an optical film was obtained in the same manner as Example 1 except that, by adjusting the conditions of the exposure step and the etching step, a plurality of structural bodies which have the average maximum width $W_{max}$, the average pitch Tp, and the average ratio $R_{w/tp}$ shown below were formed on the TAC sheet surface.
Average maximum width $W_{max}$: 138 nm
Average pitch Tp: 173 nm
Average ratio $R_{w/tp}$: 0.8

Example 5

Next, an optical film was obtained in the same manner as Example 1 except that, by adjusting the conditions of the exposure step and the etching step, a plurality of structural bodies which have the average maximum width $W_{max}$, the average pitch Tp, and the average ratio $R_{w/tp}$ shown below were formed on the TAC sheet surface.
Average maximum width $W_{max}$: 156 nm
Average pitch Tp: 173 nm
Average ratio $R_{w/tp}$: 0.9

Comparative Example 1

Figure 11A:
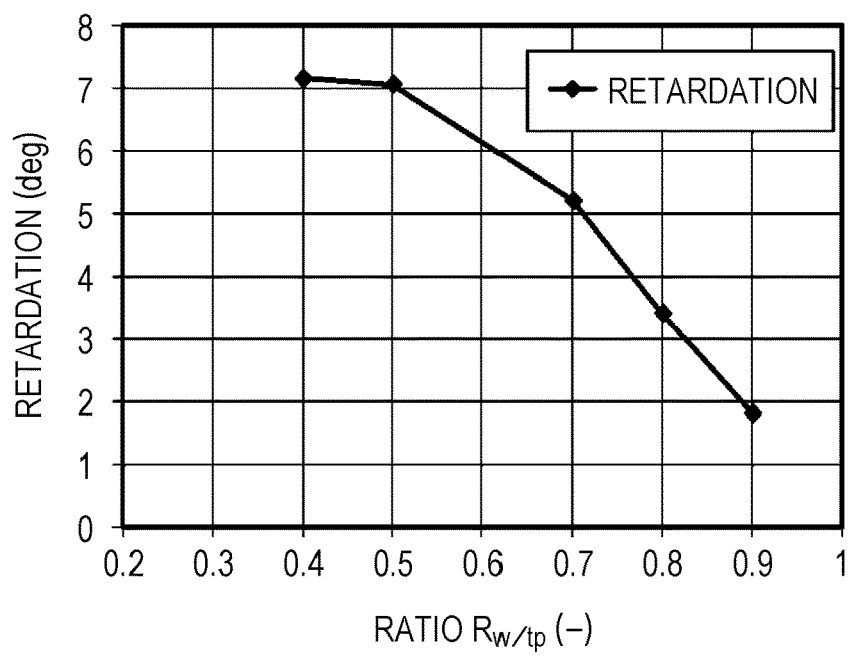
FIG. 11A is a diagram which shows retardation of optical films of Examples 1 to 5.
Figure 11B:
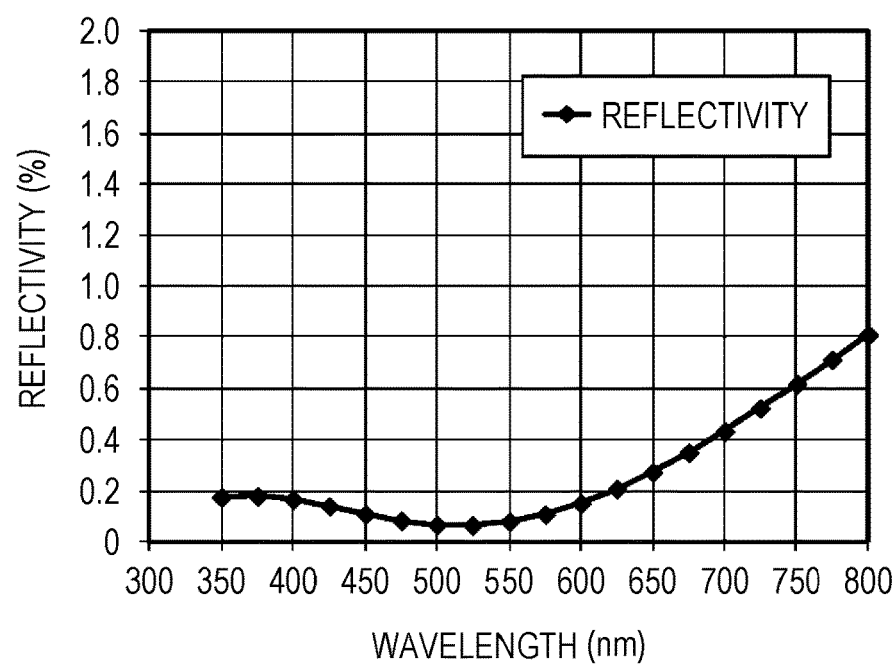
FIG. 11B is a diagram which shows the reflection spectrum of the optical film of Example 4.

Next, an optical film was obtained in the same manner as Example 1 except that, by adjusting the conditions of the exposure step and the etching step in the same manner as the Examples 1 to 5 described above, a plurality of structural bodies with the structural body shape shown below were formed on the TAC sheet surface.
Structural body diameter: 250 nm
Arrangement: hexagonal lattice
Pitch Tp: 216 nm
Structural body shape: parabolic surface
Evaluation of Retardation
The retardation of the optical films of Examples 1 to 5 obtained as described above was determined from the angle of the position where a sample became bright and the position where the sample became dark by setting the optical film between crossed Nichol prisms using the Senarmont method as the method and inserting a Senarmont compensator.
Evaluation of Reflection Spectrum
The reflection spectra of the optical films of Examples 1 to 5 obtained as described above were evaluated as follows. Firstly, black tape was stuck to the rear surface of the optical films where the plurality of structural bodies were formed. Next, by light being incident from the surface which is the opposite side to the side where the black tape was stuck, the reflection spectra (wavelength band 350 nm to 800 nm) of the optical films were measured using an evaluation apparatus (V-550) manufactured by Nippon Bunko K.K.
Evaluation Results
FIG. 11A shows the retardation evaluation results of the optical films of Examples 1 to 5. FIG. 11B shows the reflection spectrum evaluation results of the optical films of Example 4. Here, as the reflection spectrum evaluation result, the evaluation result of Example 4 where a particularly excellent reflection spectrum was obtained may be exemplified as representative.

The following is understood from the retardation evaluation results described above.

In a range where the average ratio $R_{w/tp}$ is $0.4 \leq R_{w/tp} \leq 0.5$, the retardation is maintained at a high value of approximately 0.7.

In a range where the average ratio $R_{w/tp}$ is $0.5 \leq R_{w/tp} \leq 0.9$, the retardation has a tendency to decrease. However, within this range, there are changes in the ratio of the decrease in the retardation, and in a range of $0.7 \leq R_{w/tp} \leq 0.9$, there is a tendency for the ratio of the decrease in the retardation to increase in comparison with the range of $0.5 \leq R_{w/tp} \leq 0.7$.

When the average ratio $R_{w/tp}$ is within a range of $0.4 \leq R_{w/tp} \leq 0.8$, it is possible to set the retardation to 3° or more. When the average ratio $R_{w/tp}$ is within a range of $0.4 \leq R_{w/tp} \leq 0.7$, it is possible to set the retardation to 5° or more. When considering using the optical film as a phase compensation element of a projector apparatus or the like, the retardation of the optical film is preferably set to 3° or more, more preferably set to 5° or more.

In addition, in the structure of Comparative Example 1, it was confirmed that the value of the retardation was almost 0.

The following is understood from the reflectance spectrum evaluation results described above.

Following an increase in the average ratio $R_{w/tp}$, the anti-reflection characteristic is improved. When the average ratio $R_{w/tp}$ is more than 0.5, a particularly excellent anti-reflection characteristic is obtained. This is presumed to be because the filling ratio is improved by adopting a configuration where, at a position where one structural body width out of two adjacent structural bodies is the widest, the other structural body width is the narrowest.

In Example 4 where the average ratio $R_{w/tp}$ is more than 0.5, as shown in FIG. 11B, the reflectivity is suppressed to 1% or less in the range of a wavelength band of 350 nm to 800 nm.

By the above, in order to obtain a suitable phase compensation function and an excellent anti-reflection function for application to a projector apparatus, the average ratio $R_{w/tp}$ is preferably in a range of 0.4 or more to 0.8 or less, more preferably 0.5 or more to 0.8 or less, and even more preferably 0.5 or more to 0.7 or less.

Above, specific description has been given of embodiments of the present technology; however, the present technology is not limited to the embodiments described above and various types of modifications are possible based on the technical concept of the present technology.

For example, the configurations, methods, steps, shapes, materials, numerical values, and the like listed in the embodiments described above are merely examples and configurations, methods, steps, shapes, materials, numerical values, and the like which are different to the above may be used according to necessity.

In addition, it is possible for the configurations, methods, steps, shapes, materials, numerical values, and the like of the embodiments described above to be combined with each other without departing from the spirit of the present technology.

In addition, it is possible to adopt the following configurations in the present technology.

(1)

An optical element including, on a surface thereof:
a plurality of structural bodies which extend in a first direction,
where the plurality of structural bodies are aligned at a pitch of a sub-wavelength in a second direction which intersects with the first direction, and
the widths of the structural bodies are changed periodically.

(2)

The optical element according to (1),
where at a position where the width of one structural body out of the adjacent structural bodies is the widest, the width of the other structural body is the narrowest.

(3)

The optical element according to either of (1) or (2),
where an average ratio $R_{w/tp}$ of the maximum width $w_{max}$ of the structural bodies with respect to a pitch tp of the structural bodies is 0.4 or more and 0.8 or less.

(4)

The optical element according to any of (1) to (3),
where the heights of the structural bodies are changed periodically, and
the changing periods of the width and the height of the structural bodies are synchronized.

(5)

The optical element according to any of (1) to (4),
where in-plane retardation is 3 degrees or more and 8 degrees or less.

(6)

The optical element according to any of (1) to (5), further including:
a substrate which has birefringence,
where a direction of a slow axis of the substrate and the first direction are parallel.

(7)

A projection type image display apparatus including the optical element according to any one of (1) to (6).

(8)

A liquid crystal display apparatus including the optical element according to any one of (1) to (6).

(9)

An original recording including a plurality of grooves which extend in a first direction on a surface,
where the plurality of grooves are aligned at a pitch of a sub-wavelength in a second direction which intersects with the first direction, and
the widths of the grooves are changed periodically.

(10)

The original recording according to (9),
where, at a position where one groove width out of adjacent grooves is the widest, the other groove width is the narrowest.

(11)

The original recording according to any of (9) and (10),
where an average ratio $R_{w/tp}$ of the maximum width $w_{max}$ of the grooves with respect to the pitch tp of the grooves is in a range of 0.4 or more to 0.8 or less.

(12)

The original recording according to any of (9) to (11),
where the depth of the grooves changes periodically, and the change periods of the width and depth of the grooves are synchronized.

(13)

The original recording according to any of (9) to (12),
where the surface is a columnar surface or a cylindrical surface, and
the first direction is the circumference direction of the columnar surface or the cylindrical surface.

It should be understood by those skilled in the art that various modifications, combinations, sub-combinations and alterations may occur depending on design requirements and other factors insofar as they are within the scope of the appended claims or the equivalents thereof.

What is claimed is:

1. An optical element, comprising:
a plurality of structural bodies on a surface of the optical element,
wherein the plurality of structural bodies extend in a first direction, and are aligned at a pitch of a sub-wavelength in a second direction that is orthogonal to the first direction,
wherein a width of each structural body of the plurality of structural bodies is changed periodically along the first direction such that a side surface of each structural body is a non-linear wave surface,
wherein a first period corresponding to a first non-linear wave surface of a first structural body of the plurality of structural bodies and a second period corresponding to a second non-linear wave surface of a second structural body of the plurality of structural bodies have a phase difference of 180°,
wherein the first non-linear wave surface is adjacent to the second non-linear wave surface, and
wherein an average ratio $R_{w/tp}$ of a maximum width $w_{max}$ of the plurality of structural bodies with respect to a pitch tp of the plurality of structural bodies is 0.5 or more and 0.8 or less.

2. The optical element according to claim 1, wherein at a position where the width of the first structural body is maximum, the width of the second structural body is minimum.

3. The optical element according to claim 1, wherein a height of each structural body of the plurality of structural bodies is changed periodically, and periodic change of the width and the height of each structural body are synchronized.

4. The optical element according to claim 1, wherein in-plane retardation of the optical element is 3 degrees or more and 8 degrees or less.

5. The optical element according to claim 1, further comprising a substrate which has birefringence, wherein a third direction of a slow axis of the substrate and the first direction are parallel.

6. A projection type image display apparatus, comprising:
a light source;
a liquid crystal panel; and
an optical element, wherein the optical element includes, on a surface of the optical element, a plurality of structural bodies which extend in a first direction,
wherein the plurality of structural bodies are aligned at a pitch of a sub-wavelength in a second direction that is orthogonal to the first direction,
wherein a width of each structural body of the plurality of structural bodies is changed periodically along the first direction such that a side surface of each structural body is a non-linear wave surface, wherein a first period corresponding to a first non-linear wave surface of a first structural body of the plurality of structural bodies and a second period corresponding to a second non-linear wave surface of a second structural body of the plurality of structural bodies have a phase difference of 180°, wherein the first non-linear wave surface is adjacent to the second non-linear wave surface, and wherein an average ratio $R_{w/tp}$ of a maximum width $w_{max}$ of the plurality of structural bodies with respect to a pitch tp of the plurality of structural bodies is 0.5 or more and 0.8 or less.

7. The optical element according to claim 1, wherein at a first position where the width of a structural body of the plurality of structural bodies is maximum, a height of the structural body is maximum, and wherein at a second position where the width of the structural body is minimum, the height of the structural body is minimum.

\* \* \* \* \*